(12) United States Patent
Leppänen et al.

(10) Patent No.: US 11,140,507 B2
(45) Date of Patent: Oct. 5, 2021

(54) RENDERING OF SPATIAL AUDIO CONTENT

(71) Applicant: Nokia Technologies Oy, Espoo (FI)

(72) Inventors: Jussi Leppänen, Tampere (FI); Miikka Vilermo, Siuro (FI); Arto Lehtiniemi, Lempäälä (FI); Antti Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/040,176

(22) PCT Filed: Mar. 25, 2019

(86) PCT No.: PCT/EP2019/057366
§ 371 (c)(1),
(2) Date: Sep. 22, 2020

(87) PCT Pub. No.: WO2019/192864
PCT Pub. Date: Oct. 10, 2019

(65) Prior Publication Data
US 2021/0014630 A1 Jan. 14, 2021

(30) Foreign Application Priority Data
Apr. 5, 2018 (EP) .................................... 18165943

(51) Int. Cl.
*H04S 7/00* (2006.01)
*G06F 3/01* (2006.01)
*G06F 3/16* (2006.01)

(52) U.S. Cl.
CPC .............. *H04S 7/303* (2013.01); *G06F 3/011* (2013.01); *G06F 3/165* (2013.01); *H04S 2400/11* (2013.01); *H04S 2400/13* (2013.01)

(58) Field of Classification Search
CPC .. H04S 7/303; H04S 2400/11; H04S 2400/13; G06F 3/011; G06F 3/165
See application file for complete search history.

(56) References Cited

U.S. PATENT DOCUMENTS

| 6,498,857 B1 * | 12/2002 | Sibbald ..................... H04S 7/30 381/1 |
| 6,741,273 B1 | 5/2004 | Waters et al. |

(Continued)

FOREIGN PATENT DOCUMENTS

WO 2017/178309 A1 10/2017

OTHER PUBLICATIONS

"This is How Valve's Amazing Lighthouse Tracking Technology Works", Gizmodo, Retrieved on Sep. 10, 2020, Webpage available at: https://gizmodo.com/this-is-how-valve-s-amazing-lighthouse-tracking-technol-1705356768.

(Continued)

*Primary Examiner* — Joseph Saunders, Jr.
(74) *Attorney, Agent, or Firm* — Harrington & Smith

(57) ABSTRACT

An apparatus comprising means for: obtaining an indication of a variable position of at least one user in real space; mapping the position of the user in real space to a position of the user in a sound space; controlling an output audio signal, for rendering a sound scene by a loudspeaker, the sound scene being defined by the one or more sound sources of the plurality of sound sources that are within a sub-volume of the sound space that excludes the position of the user in the sound space and that is sized in dependence upon the position of the user in the sound space.

20 Claims, 15 Drawing Sheets

(56) References Cited

U.S. PATENT DOCUMENTS

| | | | |
|---|---|---|---|
| 7,991,176 B2 | 8/2011 | Kirkeby | |
| 2013/0329922 A1* | 12/2013 | Lemieux | H04S 7/30 |
| | | | 381/307 |
| 2015/0117650 A1* | 4/2015 | Jo | H04S 7/302 |
| | | | 381/17 |
| 2016/0105757 A1 | 4/2016 | Vennström et al. | |
| 2017/0038943 A1 | 2/2017 | Seligmann et al. | |
| 2017/0325045 A1* | 11/2017 | Baek | H04S 1/002 |
| 2018/0007489 A1 | 1/2018 | Lehtiniemi et al. | |

OTHER PUBLICATIONS

Extended European Search Report received for corresponding European Patent Application No. 18165943.4, dated Sep. 20, 2018, 13 pages.

International Search Report and Written Opinion received for corresponding Patent Cooperation Treaty Application No. PCT/EP2019/057366, dated May 29, 2019, 18 pages.

Office action received for corresponding European Patent Application No. 18165943.4, dated Jun. 24, 2020, 5 pages.

* cited by examiner

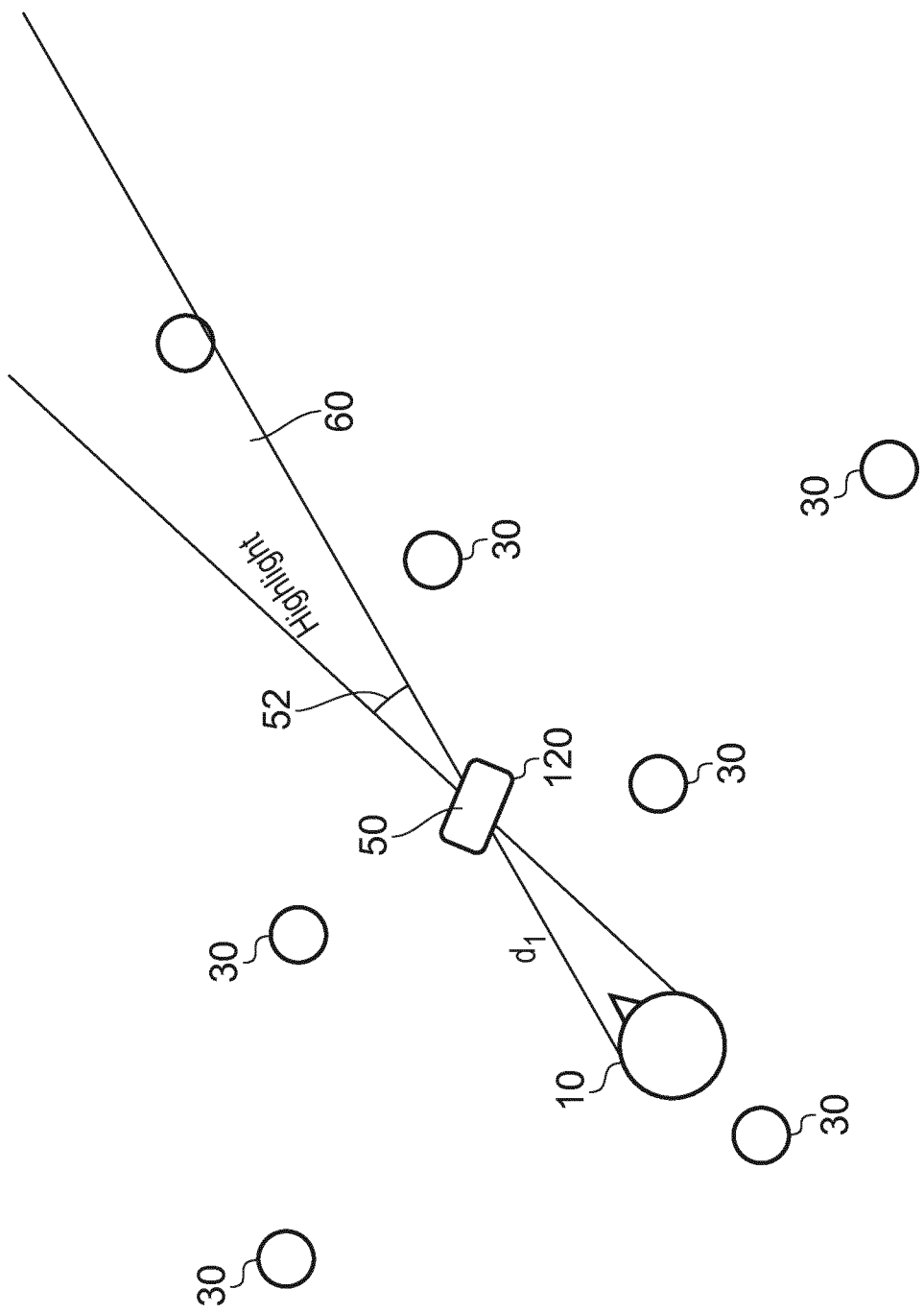

RENDERING OF SPATIAL AUDIO CONTENT

RELATED APPLICATION

This application claims priority to PCT Application No. PCT/EP2019/057366, filed on Mar. 25, 2019, which claims priority to EP Application No. 18165943.4, filed on Apr. 5, 2018, each of which is incorporated herein by reference in its entirety.

TECHNOLOGICAL FIELD

Embodiments of the present disclosure relate to rendering of spatial audio content.

BACKGROUND

Multiple loudspeakers can be used to render spatial audio content so that a listener perceives the rendered spatial audio as emanating from one or more virtual sources at one or more particular locations (position or direction). The position or direction may be a position or direction in three-dimensional space for volumetric or three dimensional spatial audio, or a position or direction in a plane for two dimensional spatial audio.

A "sound space" refers to the sound field created by an arrangement of sound sources in a space. A sound space may be defined in relation to recording sounds (a recorded sound space) and in relation to rendering sounds (a rendered sound space). A "sound scene" refers to a representation of the sound space as if listened to from a particular point of view within the sound space. A "sound object" refers to sound source that may be located within the sound space irrespective of how it is encoded. It may for example by located by position or by direction. A recorded sound object represents sounds recorded at a particular microphone or from a particular location. A rendered sound object represents sounds rendered as if from a particular location.

Different formats may be used to encode a spatially varying sound field as spatial audio content. For example, binaural encoding may be used for rendering a sound scene via headphones, a specific type of multi-channel encoding may be used for rendering a sound scene via a correspondingly specific configuration of loudspeakers (for example 5.1 surround sound), directional encoding may be used for rendering at least one sound source at a defined direction and positional encoding may be used for rendering at least one sound source at a defined position.

A particular format of spatial audio may require, for rendering, a particular arrangement of multiple loudspeakers. This can be inconvenient particularly if the loudspeaker or loudspeaker arrangement available cannot produce the encoded spatially varying sound field.

BRIEF SUMMARY

According to various, but not necessarily all, embodiments there is provided an apparatus comprising means for:
obtaining an indication of a variable position of at least one user in real space;
mapping the position of the user in real space to a position of the user in a sound space; and
controlling an output audio signal, for rendering a sound scene by a loudspeaker, to highlight at least some sound sources comprised in a sub-volume of the sound space that is dependent upon the position of the user in the sound space relative to a reference position in the sound space.

According to some but not necessarily all examples, the sub-volume is sized and/or positioned and/or oriented in dependence upon the position of the user in the sound space relative to a reference position in the sound space.

According to some but not necessarily all examples, highlighting a sound source comprised in the sub-volume comprises increasing a volume (intensity) of the sound source and/or comprises decreasing a volume of other sound sources.

In at least some examples, the sub-volume can exclude the position of the user in the sound space. The sub-volume can, in at least some examples, be sized in dependence upon the position of the user in the sound space relative to the reference position in the sound space. The sub-volume of the sound space can, in at least some examples, terminate at the reference position in the sound space. The sub-volume of the sound space can, in at least some examples, have an apex at the reference position in the sound space.

In at least some examples, for at least a range distances between the position of the user in the sound space and the reference position in the sound space, the size of the sub-volume increase as the distance between the position of the user in the sound space the reference position in the sound space decreases and the size of the sub-volume decreases as the distance between the position of the user in the sound space the reference position in the sound space increases.

In at least some examples, the apparatus comprises means for mapping a position of the loudspeaker in real space to a position in the sound space to determine the reference position in the sound space.

In at least some examples, an orientation of the loudspeaker in real space is mapped to an orientation of the loudspeaker in the sound space and the orientation in the sound space is used to determine the sound scene.

In at least some examples, highlighting a sound source comprises one or more of:
increasing gain of a sound source;
applying a reverberation effect;
applying a different reverberation effect;
mixing into an audio channel that is not delayed a delayed version of that audio channel; mixing into an audio channel that is not delayed, to a different relative extent, a delayed version of that audio channel;
changing a distance to a sound source.

According to various, but not necessarily all, embodiments there is provided a method comprising:
determining a variable position of a user in a sound space that comprises an arrangement of a plurality of sound sources at different positions; and
controlling an output audio signal, for rendering a sound scene by a loudspeaker, to highlight at least some sound sources comprised in a sub-volume of the sound space that is dependent upon the position of the user in the sound space relative to a reference position in the sound space.

According to various, but not necessarily all, embodiments there is provided a computer program that, when run on a computer, performs:
determining a variable position of a user in a sound space that comprises an arrangement of a plurality of sound sources at different positions; and
controlling an output audio signal, for rendering a sound scene by a loudspeaker, to highlight at least some sound sources comprised in a sub-volume of the sound space that is dependent upon the position of the user in the sound space relative to a reference position in the sound space.

According to various, but not necessarily all, embodiments there is provided an apparatus comprising means for:

obtaining an indication of a variable position of at least one user in real space; and mapping the position of the user in real space to a position of the user in a sound space;

controlling an output audio signal, for rendering a sound scene by a loudspeaker, the sound scene being defined by the one or more sound sources that are within a sub-volume of the sound space that excludes the position of the user in the sound space and that is sized in dependence upon the position of the user in the sound space.

According to some but not necessarily all examples, the sub-volume is sized in dependence upon the position of the user in the sound space relative to a defined position in the sound space. The defined position can be a position of the loudspeaker in the sound space. The sub-volume of the sound space can terminate at the defined position in the sound space. The sub-volume of the sound space can have an apex at the defined position in the sound space. In some examples, for at least a range distances between the position of the user in the sound space and the defined position in the sound space, the size of the sub-volume increase as the distance between the position of the user in the sound space the defined position in the sound space decreases and the size of the sub-volume decreases as the distance between the position of the user in the sound space the defined position in the sound space increases. A position of the loudspeaker in real space can be mapped to create the defined position in the sound space.

An orientation of the loudspeaker in real space can be mapped to an orientation of the loudspeaker in the sound space and the orientation in the sound space can be used to determine the sound scene.

According to some but not necessarily all examples, the apparatus comprises means for obtaining an indication of a variable position of at least one user in real space; and mapping the position of the user in real space to a position of the user in a sound space.

According to some but not necessarily all examples, the means for controlling the output audio signal for rendering the sound scene by the loudspeaker is configured to highlight some but not all sound sources comprised in the sub-volume. Highlighting a sound source can comprises one or more of: increasing gain of a sound source;

applying a reverberation effect; applying a different reverberation effect; mixing into an audio channel that is not delayed a delayed version of that audio channel;

mixing into an audio channel that is not delayed, to a different relative extent, a delayed version of that audio channel; changing a distance to a sound source.

According to various, but not necessarily all, embodiments there is provided an a method comprising: determining a variable position of a user in a sound space that comprises an arrangement of a plurality of sound sources at different positions; and controlling an output audio signal, for rendering a sound scene by a loudspeaker, the sound scene being defined by the one or more sound sources of the plurality of sound sources that are within a sub-volume of the sound space that excludes the position of the user in the sound space and that is sized in dependence upon the position of the user in the sound space.

The sub-volume can be sized in dependence upon the position of the user in the sound space relative to an equivalent position of the loudspeaker in the sound space.

According to various, but not necessarily all, embodiments there is provided a computer program that, when run on a computer, performs:

determining a variable position of a user in a sound space that comprises an arrangement of a plurality of sound sources at different positions; and controlling an output audio signal, for rendering a sound scene by a loudspeaker, the sound scene being defined by the one or more sound sources of the plurality of sound sources that are within a sub-volume of the sound space that excludes the position of the user in the sound space and that is sized in dependence upon the position of the user in the sound space.

According to various, but not necessarily all, embodiments there is provided an apparatus comprising:

at least one processor; and at least one memory including computer program code the at least one memory and the computer program code configured to, with the at least one processor, cause the apparatus at least to perform:

determining a variable position of a user in a sound space that comprises an arrangement of a plurality of sound sources at different positions; and controlling an output audio signal, for rendering a sound scene by a loudspeaker, the sound scene being defined by the one or more sound sources of the plurality of sound sources that are within a sub-volume of the sound space that excludes the position of the user in the sound space and that is sized in dependence upon the position of the user in the sound space.

According to various, but not necessarily all, embodiments there is provided an apparatus comprising means for:

obtaining an indication of a variable position of a loudspeaker in real space;

obtaining an indication of a variable position of at least one user in real space; and controlling an output audio signal, for rendering a sound scene by the loudspeaker, the sound scene being determined in dependence upon the variable position of the loudspeaker in real space and the variable position of the user in real space.

In some but not necessarily all examples, the means for controlling the output audio signal for rendering the sound scene by the loudspeaker, is configured to render the sound scene determined by the position of the loudspeaker wherein the rendered sound scene corresponds to a perceived through a virtual low-attenuation window positioned at the position of the loudspeaker.

In some but not necessarily all examples, the means for controlling the output audio signal for rendering the sound scene by the loudspeaker is configured to render the sound scene determined by the position of the user, the position of the loudspeaker wherein the rendered sound scene corresponds to a scene perceived by a virtual user at the position of the user through a virtual low-attenuation window at the position of the loudspeaker.

In some but not necessarily all examples, the means for controlling the output audio signal for rendering the sound scene by the loudspeaker is configured to render a sound scene determined by the position of the loudspeaker and the position of the user wherein the position of the loudspeaker determines what portion of a sound space is rendered by the loudspeaker as a sound scene.

In some but not necessarily all examples, the means for controlling the output audio signal for rendering the sound scene by the loudspeaker is configured to highlight some but not all sound objects comprised in a sound space, wherein the position of the user relative to the loudspeaker defines a sound space volume, being a sub-volume of the sound space, and wherein sound objects in the sound space volume are rendered with highlighting. The sound space volume can increase in size as the user moves towards the loudspeaker and decreases in size as the user moves away from the loudspeaker. The sound space volume is subtended by an angle at the position of the user that depends upon a distance of the user from the loudspeaker.

In some but not necessarily all examples, highlighting a sound object/source comprises at least increasing a gain associated with the sound object/source.

Highlighting a sound object can comprise one or more of:
applying a reverberation effect or
applying a different reverberation effect; or
mixing into an audio channel that is not delayed a delayed version of that audio channel; or
mixing into an audio channel that is not delayed, to a different relative extent, a delayed version of that audio channel; or
changing a distance to a sound object.

In some but not necessarily all examples, the means for controlling the output audio signal for rendering the sound scene by the loudspeaker is configured to control an intensity of sound rendered in dependence upon a relative distance of the user from the loudspeaker.

In some but not necessarily all examples, the apparatus comprises means for tracking movement of the loudspeaker and/or tracking movement of the user.

In some but not necessarily all examples, the means for controlling the output audio signal for rendering the sound scene by the loudspeaker is configured to provide a different cross-mix of audio channels to different input stereo channels of the loudspeaker when a relative distance of the user from the loudspeaker is less than a threshold value.

In some but not necessarily all examples, the apparatus is configured as a hand-portable device.

In some but not necessarily all examples, the apparatus comprises:
means for receiving an indication of a variable position of a user in real space for multiple users; and
means for controlling an output audio signal for rendering the sound scene by the loudspeaker the controlling being in dependence upon the variable position of the loudspeaker in real space and the variable position of each of the multiple users in real space.

In some but not necessarily all examples, a system comprises the apparatus and the loudspeaker, wherein the loudspeaker comprises, within a single enclosure, one or more transducers.

According to various, but not necessarily all, embodiments there is provided a method comprising:
determining a variable position of a loudspeaker in real space;
determining a variable position of a user in real space; and
controlling, in dependence upon the variable position of the loudspeaker in real space and the variable position of the user in real space, an output audio signal rendered by the loudspeaker.

In some but not necessarily all examples, movement of the loudspeaker controls what portion of an audio space is rendered by the loudspeaker as an audio scene and wherein movement of the user controls what portion the rendered audio scene is highlighted.

According to various, but not necessarily all, embodiments there is provided a computer program that, when run on a computer, performs:

obtaining a variable position of a loudspeaker in real space;
obtaining a variable position of a user in real space; and
controlling, in dependence upon the variable position of the loudspeaker in real space and the variable position of the user in real space, an output audio signal for rendering the sound scene by a loudspeaker.

According to various, but not necessarily all, embodiments there is provided an apparatus comprising:
at least one processor; and
at least one memory including computer program code
the at least one memory and the computer program code configured to, with the at least one processor, cause the apparatus at least to perform:
obtaining a variable position of a loudspeaker in real space;
obtaining a variable position of a user in real space; and
controlling, in dependence upon the variable position of the loudspeaker in real space and the variable position of the user in real space, an output audio signal for rendering the sound scene by a loudspeaker.

According to various, but not necessarily all, embodiments there is provided examples as claimed in the appended claims.

BRIEF DESCRIPTION

Some example embodiments will now be described with reference to the accompanying drawings in which:

FIG. 7A shows another example embodiment of the subject matter described herein;

DEFINITIONS

A "sound space" refers to the sound field created by an arrangement of sound sources in a space. A sound space may be defined in relation to recording sounds (a recorded sound space) and in relation to rendering sounds (a rendered sound space).

A "sound scene" refers to a representation of the sound space as if listened to from a particular point of view within the sound space.

A "sound object" refers to sound source that may be located within the sound space irrespective of how it is encoded. It may for example by located by position or by direction. A recorded sound object represents sounds recorded at a particular microphone or from a particular location. A rendered sound object represents sounds rendered as if from a particular location.

An indication of a position is the position or some information that indicates the position.

A position in real space is a location in two or three dimensions in the real world.

A user is an animal, for example a person, using the system or apparatus. They are the listener to the loudspeaker.

An audio signal is a signal that can be rendered by a loudspeaker. The loudspeaker may be comprised in a headset.

DETAILED DESCRIPTION

Figure 1:
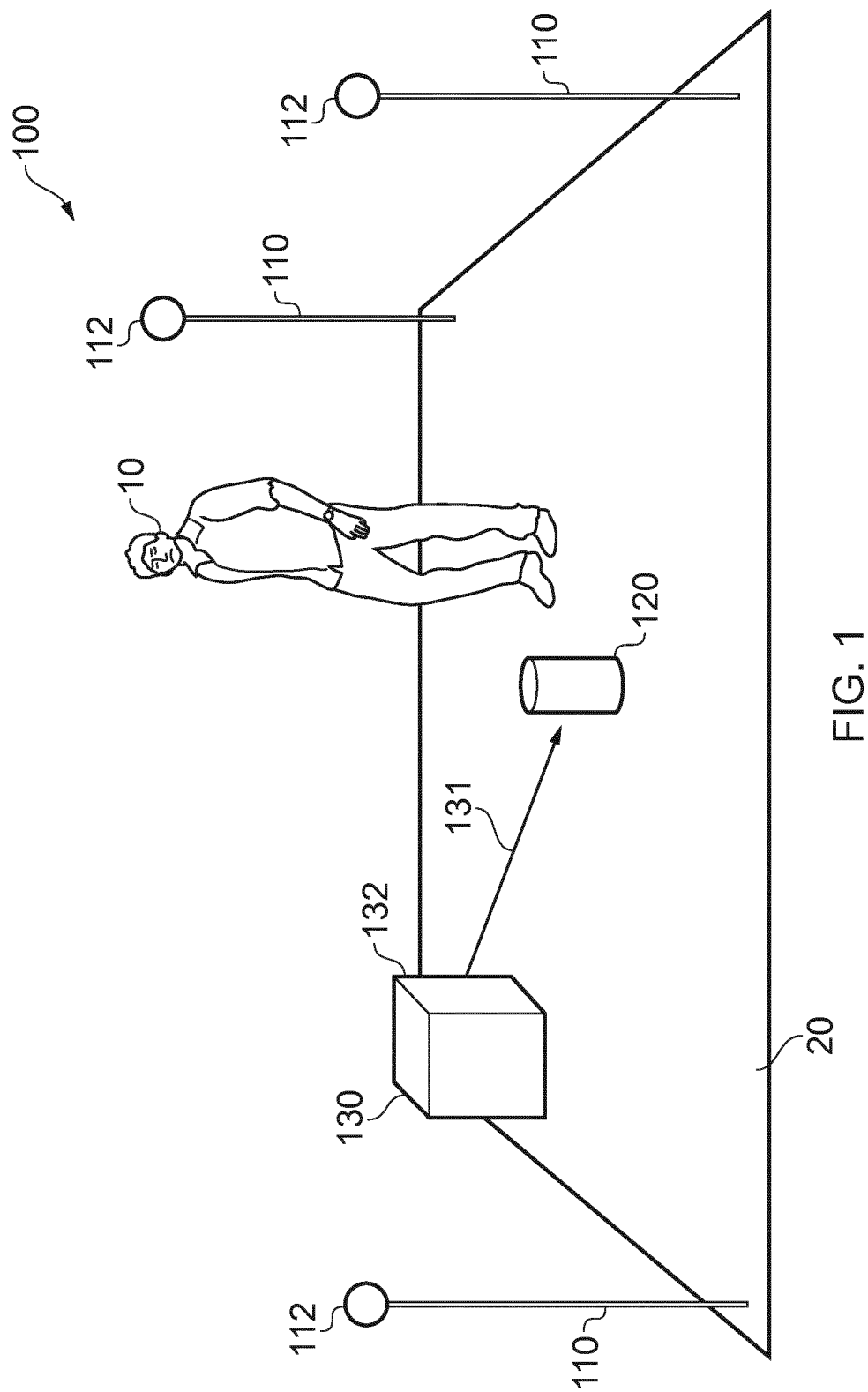
FIG. 1 shows an example embodiment of the subject matter described herein.

FIG. 1 illustrates an example of a system 100 comprising: circuitry 130 for providing audio signal 131 to a loudspeaker 120 for rendering; and a positioning system 110 for positioning the loudspeaker 120 and for positioning a user 10.

The positioning system 110 is configured to provide to the circuitry 130 an indication of a (variable) position of the loudspeaker 120 in real space 20 and to provide to the circuitry 130 an indication of a (variable) position of a user 10 in the real space 20.

In some examples, the positioning system 110 is configured to provide to the circuitry 130 an indication of a position in two or three dimensions of the loudspeaker 120 in real space 20 and to provide information indicative of a distance of a user 10 from the loudspeaker 120 or provide information indicative of a vector displacement of a user 10 from the loudspeaker 120 or provide a position in two or three dimensions of the user 10 in real space 20

Many different examples of positioning technology exist. The measurement of the distances may be made by transferring a signal between an object to be positioned and a point at a known position and measuring a distance dependent parameter of the signal, for example, time of flight of a signal or attenuation of a signal if it decreases with distance travelled or some form of disparity or phase offset between different signals associated with different points. For example, the measurement of the distances may be made by receiving a signal transmitted or reflected by an object at two points that have a known offset and measuring a disparity between captured images or phase difference between received signals. For example, an image captured at a camera may be compared to a reference image and a difference in scale between the image captured and the reference image used to estimate a distance of the object captured in the captured image and the camera. Trilateration may be used to position an object in three dimensions by measuring a distance from the object to at least three known points in space.

Although the positioning system 110 is illustrated in FIG. 1 as separate to the loudspeaker 120, in other examples, the loudspeaker 120 may also operate as the positioning system 110 or part of the positioning system 110. For example, the loudspeaker 120 may be able to position itself using inertial sensors, for example accelerometers, or some other location technology and may also be able to locate the user 10. For example, the loudspeaker 120 can contain a camera (not illustrated). The camera can be used to determine head position and orientation of the user 10. Based on the user head position and orientation and knowing the camera parameters such as zoom level, a distance estimate of the user head from the loudspeaker 120 may be obtained. The camera can be the camera of a portable hand-portable device, for example a mobile phone, and the loudspeaker can also be housed in the portable electronic device.

The circuitry 130 may be provided by an apparatus 132 or part of an apparatus 132 or across a distributed collection of apparatus 132.

The circuitry 130 is configured to obtain an indication of a variable position of the loudspeaker 120 in real space 20; obtain an indication of a variable position of a user 10 in the real space 20; and to control an output audio signal 131.

The output audio signal 131 causes, at the loudspeaker 120, rendering of a sound scene by the loudspeaker 120 to the user 10.

The circuitry 130 is configured to control the sound scene in dependence upon the variable position of the loudspeaker 120 in the real space 20 and the variable position of the user 10 in real space 20.

In some but not necessarily all examples, the circuitry 130 comprises a controller 134. However, the functions performed by the circuitry 130 may be performed by any suitable means. Therefore in some but not necessarily all examples, the apparatus 132 comprises means 130 for: obtaining an indication of a variable position of a loudspeaker 120 in real space 20; obtaining an indication of a variable position of a user 10 in the real space 20; and controlling an output audio signal 131, for rendering a sound scene by the loudspeaker 120, the sound scene being determined in dependence upon the variable position of the loudspeaker 120 in the real space 20 and the variable position of the user 10 in the real space 20.

In some but not necessarily all examples, the loudspeaker 120 comprises, within a single enclosure one, or more transducers for producing sound waves. In some but not necessarily all examples, there is a single transducer. In other examples, there are multiple transducers, for example two transducers configured in a stereo left-right arrangement.

In some but not necessarily all examples, the or each transducer is configured to generate a sound pressure level at 1 m for 1 W input signal of greater than 50 Pa.

In some but not necessarily all examples, the loudspeaker 120 comprises multiple transducers and is configured to enable amplitude panning across the multiple transducers. In some but not necessarily all examples, the loudspeaker 120 is a portable wireless loudspeaker. In some but not necessarily all examples, the portable wireless loudspeaker has a volume greater than 100 cm$^3$. In some but not necessarily all examples, the loudspeaker 120 is a loudspeaker of a portable electronic device.

Examples of portable electronic devices include a personal computer, a tablet computer, a micro-table computer, a hand-portable device configured for user input, a mobile phone such as a mobile cellular phone or wireless phone.

In some but not necessarily all examples the audio signal 131 is a monophonic mix (a single channel audio signal formed by mixing other audio signals) and is applied to the or each transducer of the loudspeaker 120.

As an example, in some but not necessarily all implementations, the user 10 is able to place the portable loudspeaker 120 at a desired position in the real space 20, and the sound scene rendered by the loudspeaker 120 is a sound scene determined in dependence upon a corresponding position of the loudspeaker 120 within the sound space. The position of the loudspeaker 120 in real space 20 is mapped to a position of the loudspeaker 120 in the sound space and the position in the sound space is used to determine the sound scene represented by the audio signal 131.

As an example, in some but not necessarily all implementations, the user 10 is able to re-orient the portable loudspeaker 120 to a desired orientation in the real space 20, and the sound scene rendered by the loudspeaker 120 is a sound scene determined in dependence upon a corresponding orientation within the sound space of the loudspeaker 120. The orientation of the loudspeaker 120 in real space 20 is mapped to an orientation of the loudspeaker 120 in the sound space and the orientation in the sound space is used to determine the sound scene represented by the audio signal 131.

As an example, in some but not necessarily all implementations, the user 10 is able to re-position themselves in the real space 20, and the sound scene rendered by the loudspeaker 120 is a sound scene determined in dependence upon a corresponding position of the user 10 within the sound space. The position of the user 10 in real space 20 is mapped to a position of the user 10 in the sound space and the position in the sound space is used to determine the sound scene represented by the audio signal 131.

The system 100 allows audio content derived from spatial audio content to be rendered without using a predetermined multiple loudspeaker arrangement while also retaining at least some spatial characteristic from the spatial audio content e.g. characteristics of the spatial audio scene at the speaker location. For example, if the output is monophonic the user does not experience a spatial audio field (he hears the sound only from the direction of the loudspeaker so the sound perception is not spatial but monophonic). However, the monophonic signal can reflect the spatial structure or characteristics of the spatial audio scene from a perspective at the loudspeaker location and at the opposite side of the speaker from the user.

Figure 2A:
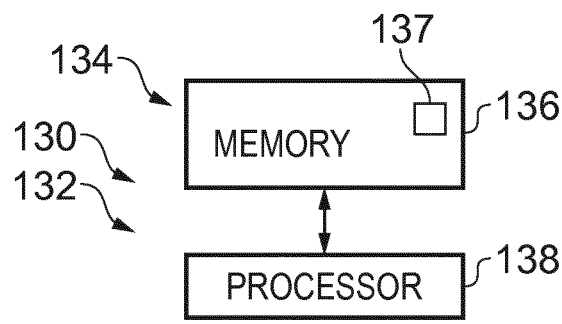
FIG. 2A shows another example embodiment of the subject matter described herein.

FIG. 2A illustrates an example of circuitry 130 of apparatus 132, implemented as a controller 134. Implementation of a controller 134 may be as controller circuitry. The controller 134 may be implemented in hardware alone, have certain aspects in software including firmware alone or can be a combination of hardware and software (including firmware).

As illustrated in FIG. 2A the controller 134 may be implemented using instructions that enable hardware functionality, for example, by using executable instructions of a computer program 137 in a general-purpose or special-purpose processor 138 that may be stored on a computer readable storage medium (disk, memory etc) to be executed by such a processor 138.

The processor 138 is configured to read from and write to the memory 136. The processor 138 may also comprise an output interface via which data and/or commands are output by the processor 138 and an input interface via which data and/or commands are input to the processor 138.

The memory 136 stores a computer program 137 comprising computer program instructions (computer program code) that controls the operation of the apparatus 132 when loaded into the processor 138. The computer program instructions, of the computer program 137, provide the logic and routines that enables the apparatus 132 to perform the methods illustrated in FIG. 3. The processor 138 by reading the memory 136 is able to load and execute the computer program 137.

The apparatus 132 therefore comprises:
at least one processor 138; and
at least one memory 136 including computer program code
the at least one memory 136 and the computer program code configured to, with the at least one processor 138, cause the apparatus 132 at least to perform:
obtaining a variable position of a loudspeaker 120 in real space 20;
obtaining a variable position of a user 10 in real space 20; and
controlling, in dependence upon the variable position of the loudspeaker 120 in real space 20 and the variable position of the user 10 in real space 20, an output audio signal 131 for rendering the sound scene by the loudspeaker 120.

Figure 2B:
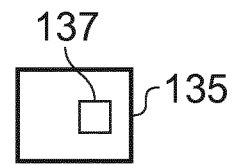
FIG. 2B shows another example embodiment of the subject matter described herein.

As illustrated in FIG. 2B, the computer program 137 may arrive at the apparatus 132 via any suitable delivery mechanism 135. The delivery mechanism 135 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 137. The delivery mechanism may be a signal configured to reliably transfer the computer program 137. The apparatus 132 may propagate or transmit the computer program 137 as a computer data signal.

Computer program instructions for causing an apparatus 132 to perform at least the following or for performing at least the following:
obtaining a variable position of a loudspeaker 120 in real space 20;
obtaining a variable position of a user 10 in real space 20; and
controlling, in dependence upon the variable position of the loudspeaker 120 in real space 20 and the variable position of the user 10 in real space 20, an output audio signal for rendering the sound scene by the loudspeaker 120.

The computer program instructions may be comprised in a computer program, a non-transitory computer readable medium, a computer program product, a machine readable medium. In some but not necessarily all examples, the computer program instructions may be distributed over more than one computer program.

Although the memory 136 is illustrated as a single component/circuitry it may be implemented as one or more separate components/circuitry some or all of which may be integrated/removable and/or may provide permanent/semi-permanent/dynamic/cached storage.

Although the processor 138 is illustrated as a single component/circuitry it may be implemented as one or more separate components/circuitry some or all of which may be integrated/removable. The processor 138 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 3:
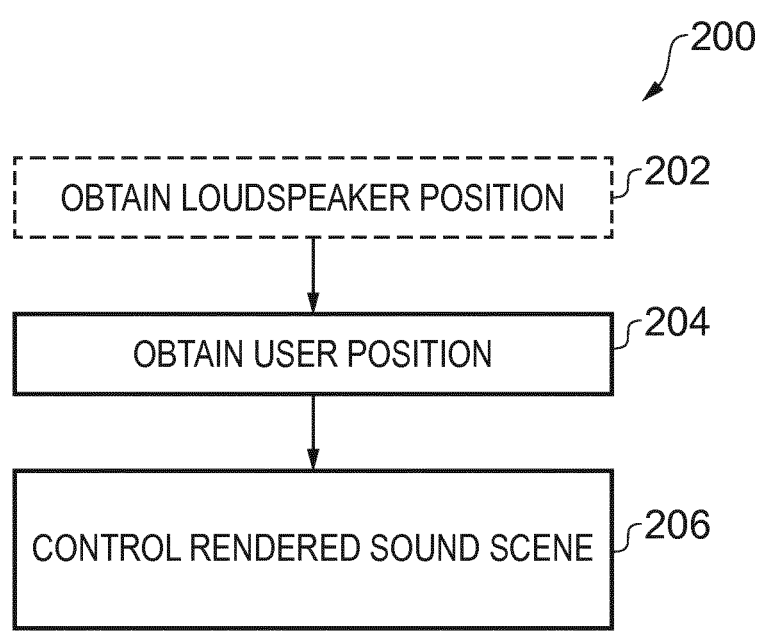
FIG. 3 shows another example embodiment of the subject matter described herein.

FIG. 3 method illustrates an example of a method 200 for controlling an output audio signal that is rendered by the loudspeaker 120. The method is performed by the apparatus 132.

In one example of the method 200, at block 202, the method 200 comprises determining a variable position of a loudspeaker 120 in real space 20.

At block 204, the method 200 comprises determining a variable position of a user 10 in real space 20.

At block 206, the method 200 comprises controlling, in dependence upon the variable position of the loudspeaker 120 in real space 20 and the variable position of the user 10 in real space 20, an output audio signal rendered by the loudspeaker 120.

As an example, in some but not necessarily all implementations, the user 10 is able to place the portable loudspeaker 120 at a chosen position and/or orientation in the real space 20 and/or re-position themselves in the real space 20, and the sound scene rendered by the loudspeaker 120 is a sound scene determined in dependence upon a corresponding position and/or orientation within the sound space of the loudspeaker 120 and a corresponding position of the user 10 within the sound space.

In other examples, the position of the loudspeaker 120 is not determined and step 202 is not performed.

At block 204, the method 200 comprises determining a variable position of a user 10 in a sound space that comprises an arrangement of a plurality of sound sources 30 at different positions. In some but not necessarily all examples, this block 204 may comprise: obtaining an indication of a variable position of at least one user 10 in real space 20; and mapping the position of the user 10 in real space 20 to a position of the user 10 in a sound space. At block 206, the method 200 comprises: controlling an output audio signal 131, for rendering a sound scene by the loudspeaker 120, the sound scene being defined by the one or more sound sources 30 of the plurality of sound sources 30 that are within a sub-volume 60 of the sound space that excludes the position of the user 10 in the sound space and that is sized in dependence upon the position of the user in the sound space. Examples of a sub-volume 60 will be described later with reference to FIGS. 7A, 7B, 8A, 8B The blocks 204, 206 (and optionally 202) illustrated in the FIG. 3 may represent steps in a method and/or sections of code in the computer program 137. The illustration of a particular order to the blocks does not necessarily imply that there is a required or preferred order for the blocks and the order and arrangement of the block may be varied. Furthermore, it may be possible for some blocks to be omitted.

Figure 4:
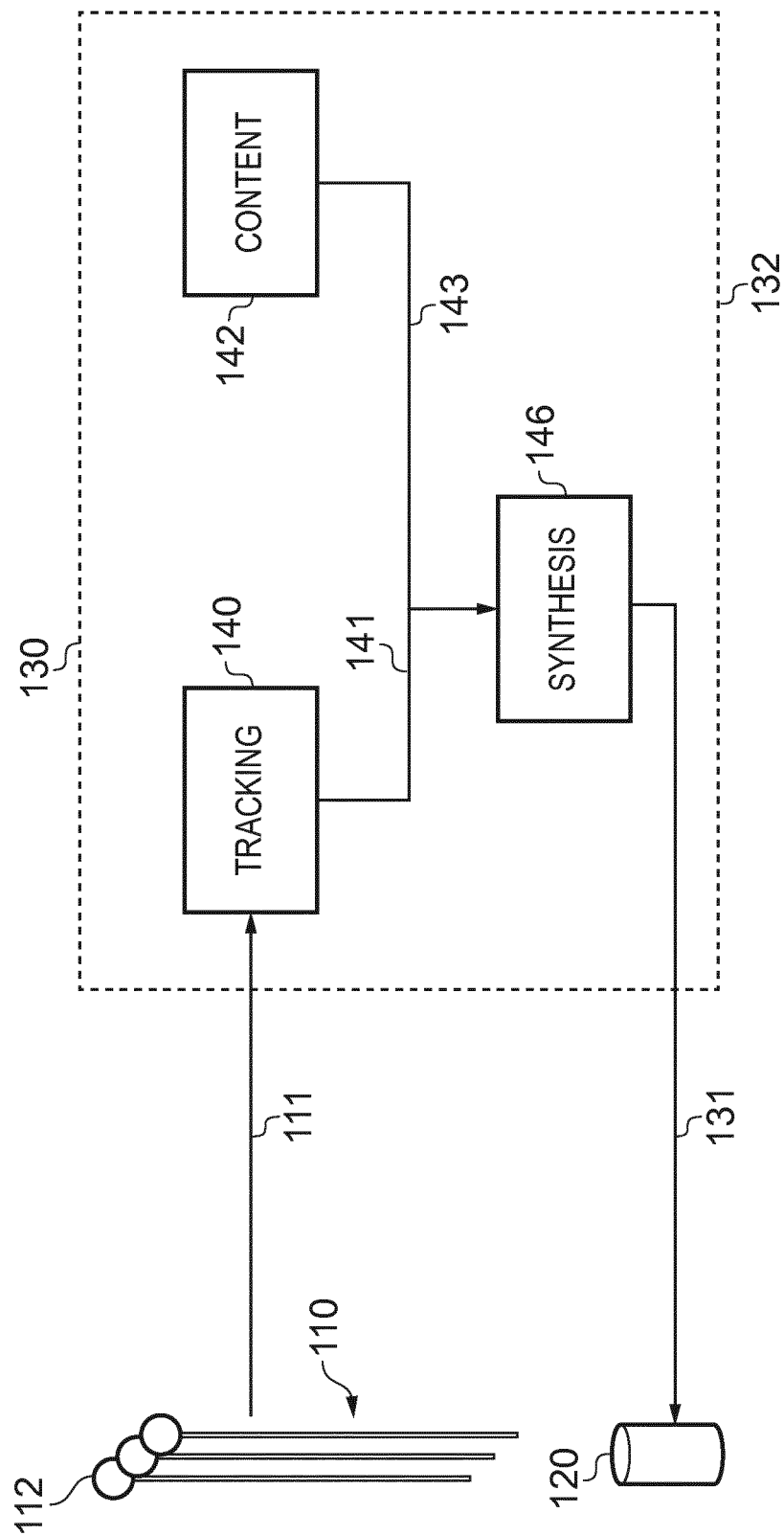
FIG. 4 shows another example embodiment of the subject matter described herein.

FIG. 4 illustrates an example of a system 100 as illustrated in FIG. 1. The operational components of the circuitry 130 are illustrated in more detail, in this example.

FIG. 4 illustrates an example of a system 100 comprising: circuitry 130 for providing audio signal 131 to a loudspeaker 120 for rendering; and a positioning system 110 for positioning the loudspeaker 120 and for positioning a user 10. In this example, the circuitry 130 is comprised in a single apparatus 132 that operates as a server.

Spatial audio content 143 may be stored or accessed by the content delivery circuitry 142 and provided to the synthesis circuitry 146. Content delivery circuitry 142 is one of many examples of content delivery means that may be used by the apparatus 132. In other examples it may, for example, be a software or firmware module performed by a controller or processor.

Tracking circuitry 140 continually positions the user 10 and the loudspeaker 120 based on input sensor data 111 from the sensors 112 of the positioning system 110. In some but not necessarily all examples, the tracking circuitry 140 is configured to continually position the user 10 and the loudspeaker 120, in real-time, based on live input sensor data 111 from the sensors 112 of the positioning system 110.

The tracking circuitry 140 is configured to provide to the synthesis circuitry 146 an indication 141 of a (variable) position of the loudspeaker 120 in real space 20 and is configured to provide to the synthesis circuitry 146 an indication 141 of a (variable) position of the user 10 in real space 20. This operation continues over time tracking movement of the loudspeaker 120 and/or tracking movement of the user 10.

Tracking circuitry 140 is one of many examples of tracking means that may be used by the apparatus 132. In other examples it may, for example, be a software or firmware module performed by a controller or processor.

Synthesis circuitry 146 is configured to receive the spatial audio content 143 from the content delivery circuitry 142 and to receive 141 a current position of the user 10 and a current position of the loudspeaker 120 from the tracking circuitry 140, and create the audio signal 131 that is dependent upon the current position of the loudspeaker 120 and the user's current position relative to the loudspeaker 120. The audio signal 131 can be streamed to the loudspeaker 120.

Synthesis circuitry 146 is one of many examples of synthesizer means that may be used by the apparatus 130. In other examples it may, for example, be a software or firmware module performed by a controller or processor.

The audio signal 131 may for example be a single channel signal (a monophonic signal) formed by mixing audio signals representing the spatial audio content 143.

The spatial audio content 143 may be provided in a native format that cannot be properly rendered by the loudspeaker 120 such as a multi-channel format, for example, binaural format, a parametric spatial audio format such as Directional Audio Coding (DirAC), multi-channel loudspeaker format, for example, 5.1 surround sound. The multi-channels of the spatial audio content 143 are re-mixed, for example downmixed, by the synthesis circuitry 146 to a simplified format that can be properly rendered by the loudspeaker 120 such as a single channel (monophonic) format or, if appropriate a stereo format.

Thus, in some but not necessarily all examples, the synthesis circuitry 146 is configured to produce an audio signal 131 that although down-mixed and no longer fully encoding the original sound field encoded by the spatial audio content 143 still retains some spatial audio characteristic by being dependent upon the relative position (orientation and/or distance) of the user 10 to the loudspeaker 120 and the position of the loudspeaker 120.

In the example illustrated, the synthesis circuitry 146 is configured to convert the position (and/or orientation) in the real space 20 of the portable loudspeaker 120 to a position (and/or orientation) within the sound space and control an output audio signal 131 for rendering a sound scene by the loudspeaker 120, the sound scene being determined in dependence upon that position (and/or orientation) within the sound space. For example, the position (and/or orientation) of the loudspeaker 120 determines what portion of a sound space is rendered by the loudspeaker 120 as a sound scene.

As an example, in some but not necessarily all implementations, the user 10 is able to place the portable loudspeaker 120 at a chosen position in the real space 20, that position is converted to a position within the sound space by the synthesis circuitry 146, and the sound scene rendered by the loudspeaker 120 is defined by that position within the sound space. When the user 10 moves the portable loudspeaker 120 to a new position in the real space 20, that new real position is converted to a new position within the sound space, and a new sound scene is rendered by the loudspeaker 120 that is defined by that new position within the sound space.

Although the sound scene rendered by the loudspeaker 120 is a sound scene determined in dependence upon a corresponding position within the sound space of the loudspeaker 120 and therefore has spatial characteristic it is not necessarily rendered as spatial audio because the loudspeaker 120 cannot necessarily produce a spatially varying sound field that can locate sound sources at different positions. The rendered sound scene is not spatially enveloping as the user will not get an immersed perception of the virtual audio scene (he will not hear the audio as if he was really in the virtual scene, with all acoustic cues such as binaural level and time differences).

In the example illustrated, the synthesis circuitry 146 is configured to convert the position in the real space 20 of the user 10 to a position within the sound space relative to the loudspeaker 120, and control an output audio signal 131, for rendering a sound scene by the loudspeaker 120, the sound scene being determined in dependence upon that position of the user 10 within the sound space. For example, the position of the user 10 determines what portion of a sound space is rendered by the loudspeaker 120 as a sound scene.

As an example, in some but not necessarily all implementations, the user 10 is able to re-position themselves in the real space 20, and that position is converted to a position within the sound space by the synthesis circuitry 146, and the sound scene rendered by the loudspeaker 120 is determined by that position within the sound space. When the user 10 moves to a new position in the real space 20, that new real position is converted to a new position within the sound space, and a new sound scene is rendered by the loudspeaker 120 that is determined by that new position within the sound space.

Although the sound scene rendered by the loudspeaker 120 is a sound scene determined in dependence upon a corresponding position within the sound space of the user 10 and therefore has spatial characteristic it is not necessarily rendered as spatial audio because the loudspeaker 120 cannot necessarily produce a spatially varying sound field that can locate sound sources at different positions.

The user's position affects the audio rendered from the loudspeaker 120 creating a spatial characteristic and making the experience more interactive and engaging. The user 10 is able to adjust the audio to his liking in an intuitive way by walking to different positions around the loudspeaker 120.

The sound scene rendered by the loudspeaker 120 is therefore defined at least partially by the position of the loudspeaker 120 and the position of the user 10 relative to the loudspeaker 120 in the sound space, alternatively or additionally the sound scene rendered by the loudspeaker 120 is defined at least partially by the position of the loudspeaker 120 and is adapted in dependence upon the position of the user 10 relative to the loudspeaker 120 in the sound space.

For example, in some but not necessarily all examples, the synthesis circuitry 146 is configured to control an intensity of a sound source rendered in dependence upon a relative distance of the user 10 from the loudspeaker 120. For example, the intensity may scale as the inverse square of that distance.

In the example illustrated, the synthesis circuitry 146 is configured to produce an audio signal 131 by mixing other audio signals representing the spatial audio content 143, however pre-processing of the audio signals before mixing may occur.

The pre-processing may be dependent upon the relative position (orientation and/or distance) of the user 10 to the loudspeaker 120 and the position of the loudspeaker 120.

For example, a sound source may be selected for highlighting based upon the relative position (orientation and/or distance) of the user 10 to the loudspeaker 120, the position of the loudspeaker 120 and the spatial arrangement of sound sources in the sound space. The spatial arrangement of sound sources in the sound space may be encoded within the spatial audio content 143 or provided as additional metadata.

Different pre-processing is possible. For example, a selected sound source may be pre-processed by applying one or more of the following adaptations:

increasing a gain (increasing intensity of the sound source);

applying a reverberation effect or applying a different reverberation effect;

cross-mixing a delayed and a non-delayed channel representing the sound source or varying the number of delayed channels or the delay for the delayed channels; changing a perceived distance to a sound source.

Whether an adaptation is performed, and a scale of an adaptation performed may be dependent upon the relative position (orientation and/or distance) of the user to the loudspeaker 120, the position of the loudspeaker 120 and the arrangement of sound sources in the sound space.

In addition, in the example illustrated but not necessarily all examples, as the user 10 moves closer to the loudspeaker 120, the audio signal 131 may be switched from a single channel signal (monophonic mix) to a dual channel signal. For example, as the user 10 moves closer to the loudspeaker 120, stereo-widening is used to create an effect of the audio being heard with a large spatial extent and the spatial extent may increase as the user 10 approaches.

In some but not necessarily all examples amplitude panning techniques may be used to create a sound object. To render spatial audio content 143 fully left, it is mixed completely to the left transducer of the loudspeaker 120, and correspondingly fully right when the spatial audio content is fully right. When the sound source is in the center, spatial audio content 143 is mixed with equal gain to the two transducers of the loudspeaker 120. When the spatial sound source is in between full left and full right positions, methods of amplitude panning are used to position the audio. For example, the known method of vector-base amplitude panning (VBAP) can be used The following description of stereo-widening will be described without amplitude panning. However, it should be appreciated that amplitude panning could be applied as well.

Stereo-widening may be enabled when the separation distance between the user 10 and the loudspeaker 120 is less than a threshold distance and the loudspeaker 120 is capable of producing stereo output. The threshold may depend upon a distance separation of left-right transducers of the loudspeaker 120 in the horizontal plane. However, it may be of the order 10 cm for a portable loudspeaker 120.

The apparatus 132 may determine whether or not to perform stereo-widening, for example, based on the position of the user 10 relative to the loudspeaker 120, the capability of the loudspeaker 120 and the orientation of the loudspeaker 120 relative to the user 10.

If the apparatus 132 determines to perform stereo-widening, the audio signal 131 may be switched from a single channel signal (mono-mix) to a dual channel signal.

To implement stereo-widening the loudspeaker 120 needs two transducers arranged in a left-right configuration (separated in the horizontal plane). The loudspeaker 120 may be configured to inform the apparatus 132 that it is configured for stereo output. In some examples, the loudspeaker 120 has an orientation sensor and is configured to inform the apparatus 132 that it is oriented for stereo output.

When the user 10 is close enough to such a loudspeaker 120, if one of the two transducers is to the left and the other to the right of the user 10, they can be used to play back stereo audio to the user 10. The stereo effect can be amplified if the two loudspeaker signals are processed with "stereo widening". Stereo widening is a method where two or more closely placed loudspeaker transducers are used to create audio that is perceived as wider (horizontally bigger) by the user 10 than would otherwise be possible with closely spaced loudspeaker transducers.

In one example implementation, stereo widening may be achieved by dividing a single channel audio signal into a left channel and a right channel and processing the left channel and the right channel differently.

The left channel is filtered using a frequency dependent filter that attenuates higher frequencies more than lower frequencies to produce a filtered left channel. The filter may be an equalizer configured as an infinite impulse response filter.

The right channel is filtered using a frequency dependent filter that attenuates higher frequencies more than lower frequencies to produce a filtered right channel. The filter may be an equalizer configured as an infinite impulse response filter.

The filtered left channel is mixed with a modified version of the filtered right channel to produce an output left channel as part of the audio signal 131.

The filtered right channel is mixed with a modified version of the filtered left channel to produce an output right channel as part of the audio signal 131.

The modified version of the filtered right channel is the filtered right channel, delayed by N samples, and filtered to reducing gain by g.

The modified version of the filtered left channel is the filtered left channel, delayed by N samples, and filtered to reducing gain by g.

Stereo-widening may be controlled using the delay parameter N. For example, the delay parameter N can be increased as the user 10 gets closer to the loudspeaker 120. For example, when user distance is 40 cm and transducer separation distance is 5 cm, a good value for N is 1 and when the user distance is 20 cm a good value for N is 2.

In some implementations the left and right channels are, in addition, cross-mixed before filtering. This cross-mix does not introduce respective delays but does use a variable gain for the crossed channel. This variable gain may also be varied to affect perceived stereo width.

In some of the examples described above the audio signal 131 is described as a cross-mix of a number of original audio signals. In some examples, the audio signal 131 is only a cross-mix of a number of original audio signals. In other examples, the audio signal 131 is a cross-mix of a number of original audio signals that is mixed with one or more or all of the original audio signals. Thus, the effect of any adaptations applied by the synthesis circuitry 146 can be controlled.

The audio signal 131 may have any suitable format that achieves the required effect at the loudspeaker 120. The format and information content of the audio signal 131 may therefore be dependent upon capabilities of the loudspeaker 120.

In some examples, spatial audio content 143 may include control parameters that control when and/or how the spatial audio content 143 can be processed by the apparatus 132 to produce the audio signal 131.

The control parameters may for example, control how and to what extent the sound scene, rendered at the loudspeaker 120 in response to the audio signal 131, is determined in dependence upon the variable position of the loudspeaker 120 in real space 20 and the variable position of the user 10 in real space 20. The control parameters in the audio content 143 may, for example control or influence, any parameter that controls processing of the spatial audio content 143 by the apparatus 132.

The FIGS. 5, 6A, 6B, 7A, 7B, 8A, 8B may be considered to be an illustration of real space 20, in which case, sound sources 30, which have positions in the sound space, are illustrated at corresponding positions in the real space 20. The Figs then illustrates actual movement of the loudspeaker 120 or user 10 in the real space 20.

Alternatively, they may be considered to be an illustration of the sound space, in which case, sound sources 30 have positions in the sound space, and the loudspeaker 120 or user 10 which has a position in the real space 20 is illustrated at a corresponding position in the sound space. The sound sources 30 depict the positions of the sound sources in the sound space They do not depict the positions of the sound sources as perceived by the user; the user perceives the downmixed spatial audio from the direction of the loudspeaker 120.

Figure 5:
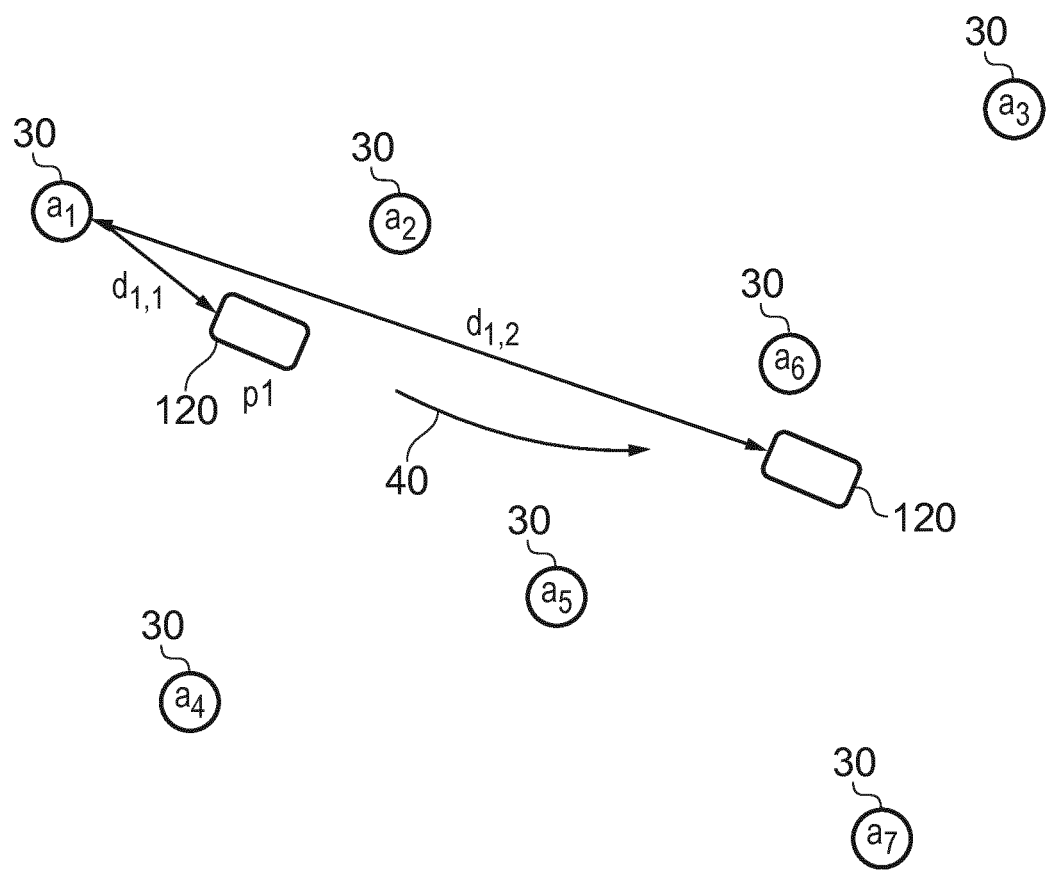
FIG. 5 shows another example embodiment of the subject matter described herein.

FIG. 5 illustrates an effect of moving the loudspeaker 120.

The user 10 is able to place the portable loudspeaker 120 at a chosen position $p1_r$ in the real space 20, that position $p1_r$ is converted to a position $p1_s$ within the sound space by the synthesis circuitry 146, and the sound scene rendered by the loudspeaker 120 is defined by that position $p1_s$ within the sound space. When the user 10 moves 40 the portable loudspeaker 120 to a new position p21 in the real space 20, that new real position p21 is converted to a new position $p2_s$ within the sound space, and a new sound scene is rendered by the loudspeaker 120 that is defined by that new position $p2_s$ within the sound space.

In some but not necessarily all examples, the synthesis circuitry 146 is configured to control a perceived importance of at least one rendered sound source 30 rendered in dependence upon its distance from the loudspeaker 120. An increase in importance may be indicated by increasing loudness. A decrease in importance may be indicated by decreasing loudness or removing the sound source 30. As loudness increases reverberation or the effects of indirect channels may be decreased as well. As loudness decreases reverberation or the effects of indirect channels may be increased as well.

In some but not necessarily all examples, the synthesis circuitry 146 is configured to control a perceived distance of at least one rendered sound source 30 rendered in proportion to a relative distance d of the user 10 from the loudspeaker 120 in real space 20. For example, in some but not necessarily all examples, the synthesis circuitry 146 is configured to control an intensity of a sound source 30 rendered in dependence upon a relative distance d of the user 10 from the loudspeaker 120 in real space 20. For example, the intensity may scale as the inverse square of that distanced. As loudness increases reverberation or the effects of indirect channels may be decreased as well.

Figure 6A:
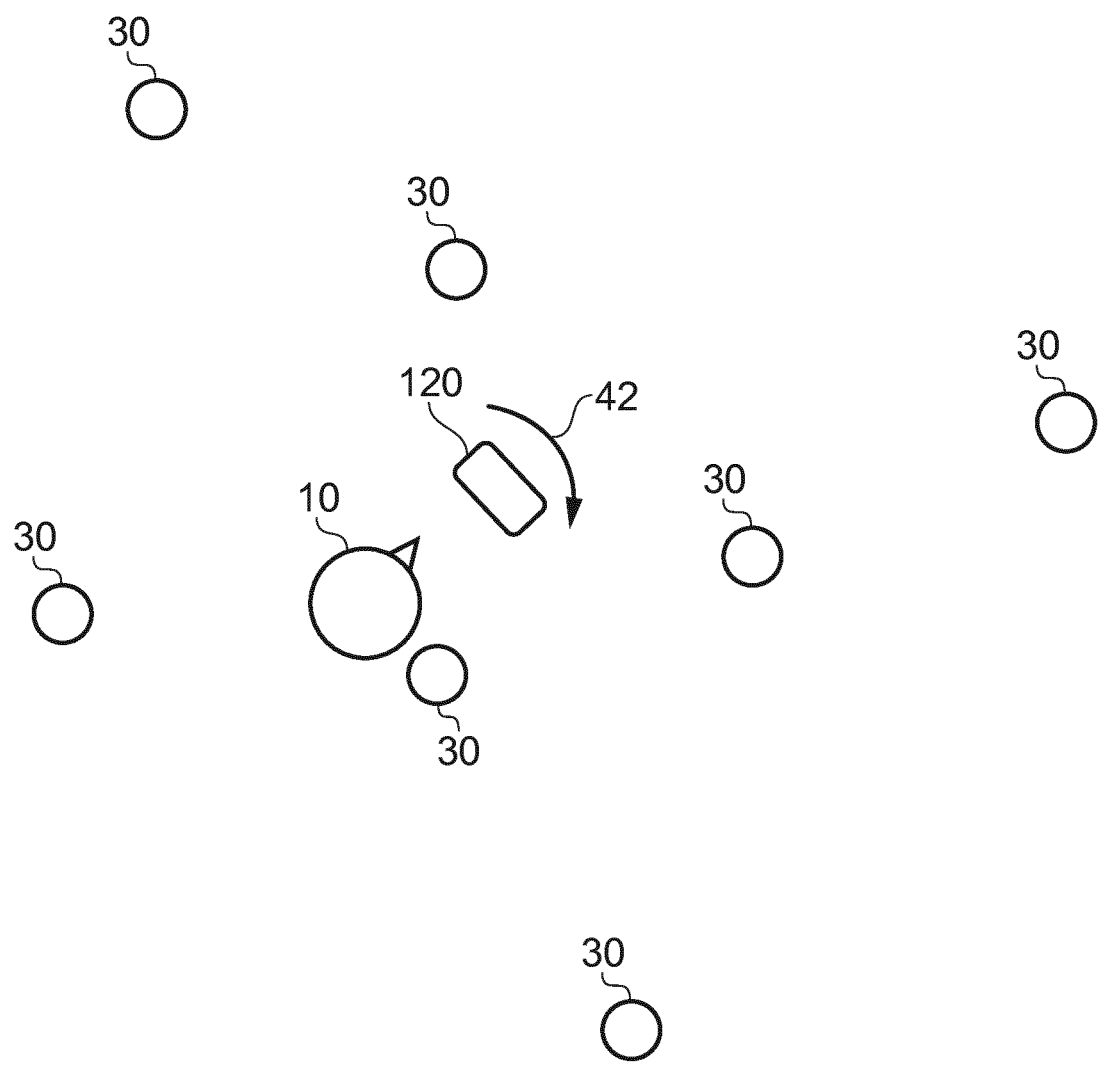
FIG. 6A shows another example embodiment of the subject matter described herein.
Figure 6B:
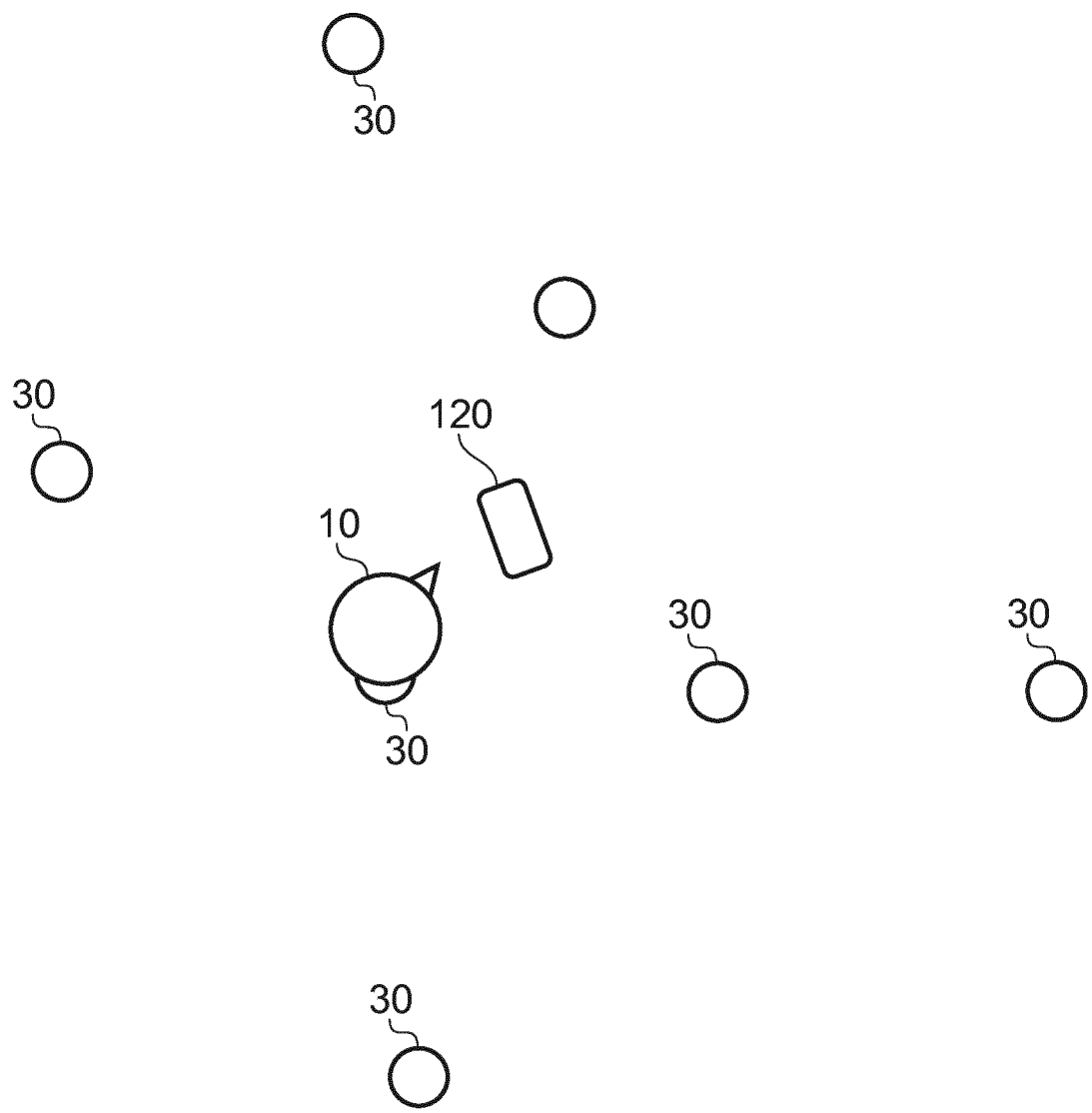
FIG. 6B shows another example embodiment of the subject matter described herein.

FIGS. 6A and 6B illustrates an effect of re-orienting the loudspeaker 120.

The user 10 is able to place the portable loudspeaker 120 at a chosen orientation in the real space 20, that orientation is converted to an orientation (point of view) within the sound space by the synthesis circuitry 146, and the sound scene rendered by the loudspeaker 120 is defined by that orientation (point of view) within the sound space. When the user 10 re-orients 42 the portable loudspeaker 120 to a new orientation in the real space 20, that new real orientation is converted to a new orientation within the sound space, and a new sound scene is rendered by the loudspeaker 120 that is defined by that new orientation within the sound space.

In some but not necessarily all examples, the synthesis circuitry 146 is configured to control a perceived importance of at least one rendered sound source 30 rendered in dependence upon its relationship to the orientation of the loudspeaker 120. An increase in importance may be indicated by increasing loudness. A decrease in importance may be indicated by decreasing loudness or removing the sound source 30. As loudness increases reverberation or the effects of indirect channels may be decreased as well. As loudness decreases reverberation or the effects of indirect channels may be increased as well.

Thus, movement of the loudspeaker 120 can control what portion of an audio space is rendered by the loudspeaker 120 as an audio scene. For example, only sound sources with a certain distance and/or within a certain range of orientations relative to the loudspeaker 120 may be rendered. The position and/or orientation of the loudspeaker 120 determines what portion of a sound space is rendered by the loudspeaker 120 as a sound scene.

Also, movement of the user 10 can be used to control what portion of an audio space is rendered by the loudspeaker 120 and/or what portion the rendered audio scene is highlighted. The distance of the user 10 to the loudspeaker 120 has an effect on which sound sources are highlighted.

Figure 7B:
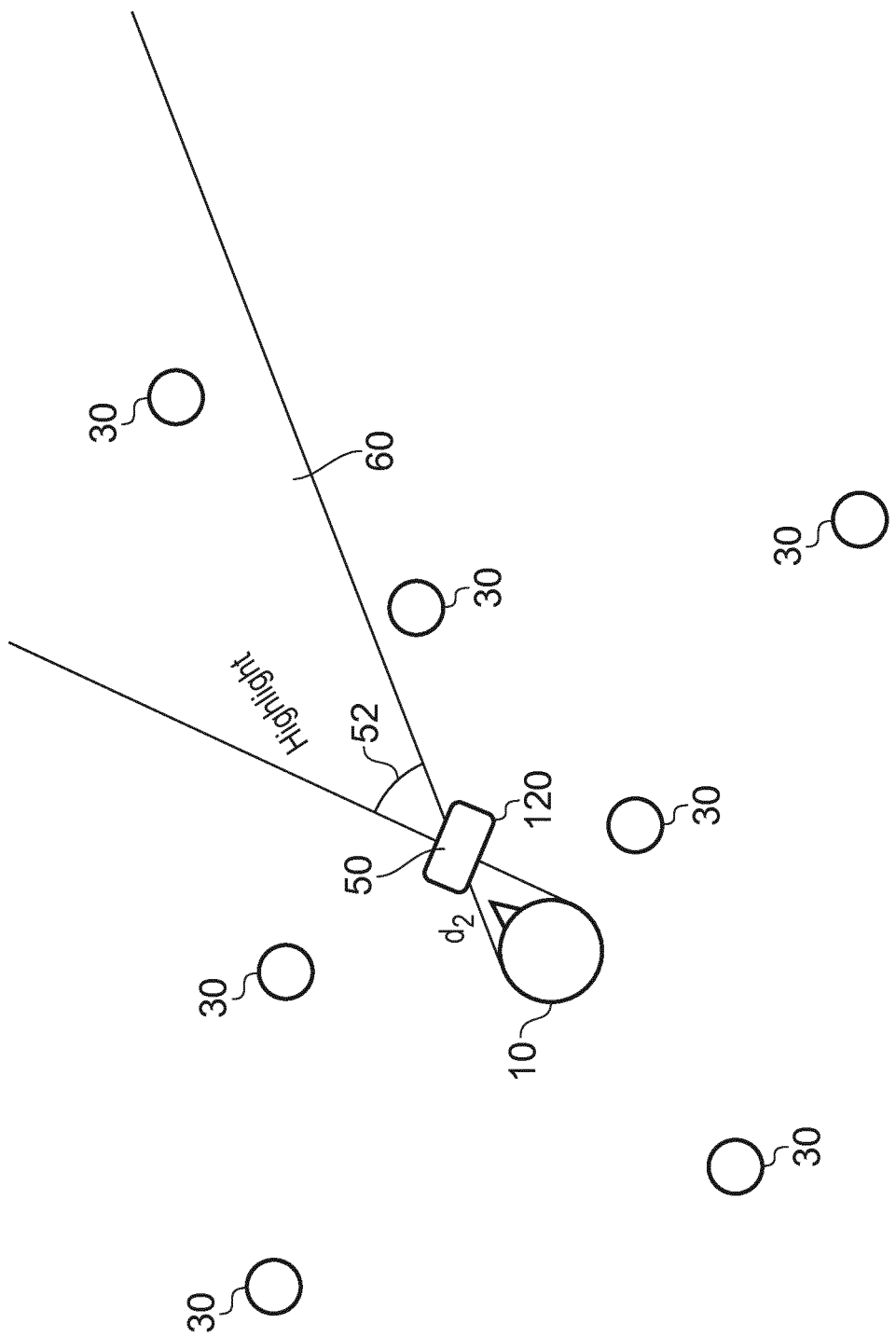
FIG. 7B shows another example embodiment of the subject matter described herein.

In FIGS. 7A and 7B, the synthesis circuitry 146 models a virtual low-attenuation window 50 at the position of the loudspeaker 120.

The synthesis circuitry 146 is configured to control the output audio signal 131 for rendering the sound scene by the loudspeaker 120, to render a sound scene determined by a position of the loudspeaker 120 and by the sound space wherein the rendered sound scene corresponds to a scene of the sound space perceived through a virtual low-attenuation window 50 positioned at the position of the loudspeaker 120.

The field of view 52 through this window 50 can be dependent upon a distance d of the user 10 from the loudspeaker 120.

The synthesis circuitry 146 is configured to control the output audio signal 131 for rendering the sound scene by the loudspeaker 120 to render a sound scene determined by a position of the user 10, a position of the loudspeaker 120 and a sound space wherein the rendered sound scene corresponds to a scene of the sound space perceived by a virtual user at the position of the user 10 through a virtual low-attenuation window 50 at the position of the loudspeaker.

Thus, synthesis circuitry 146 is configured to highlight some but not all sound sources 30 comprised in a sound space. The position of the user 10 relative to the loudspeaker 120 defines a sound space volume 60, being a sub-volume of the sound space, and sound sources 30 in the sound space volume 60 are rendered with highlighting. The sound space volume 60 increases in size as the user 10 moves towards the loudspeaker 120 as the field of view 52 increases and decreases as the user 10 moves away. In the example illustrated, the window is a point and the sound space volume 60 is a sector subtended by an angle at the position of the loudspeaker 120 (the window 50) that depends upon a distance of the user 10 from the loudspeaker 120. In another example, the window 50 has a lateral extent w and the sound space volume 60 is a sector subtended by an angle at the position of the user 10 and constrained by edges of the window 50 that depends upon a distance of the user 10 from the loudspeaker 120.

Whether or not a virtual window is simulated, the synthesis circuitry 146 can be configured to highlight some but not all sound sources 30 comprised in a sound space. The position of the user 10 relative to the loudspeaker 120 defines a sound space volume 60, being a sub-volume of the sound space, and sound sources 30 in the sound space volume 60 are rendered with highlighting.

The sub-volume 60 is sized in dependence upon the position of the user in the sound space relative to the position of the loudspeaker 120 in the sound space. The sound space volume increases in size as the user 10 moves towards the loudspeaker 120 and decreases as the user 10 moves away from the loudspeaker. For at least a range distances between the position of the user in the sound space and the defined position in the sound space, the size of the sub-volume increase as the distance between the position of the user in the sound space the defined position in the sound space decreases and the size of the sub-volume decreases as the distance between the position of the user in the sound space the defined position in the sound space increases.

The sub-volume 60 of the sound space excludes the position of the user 10 in the sound space.

Figure 8A:
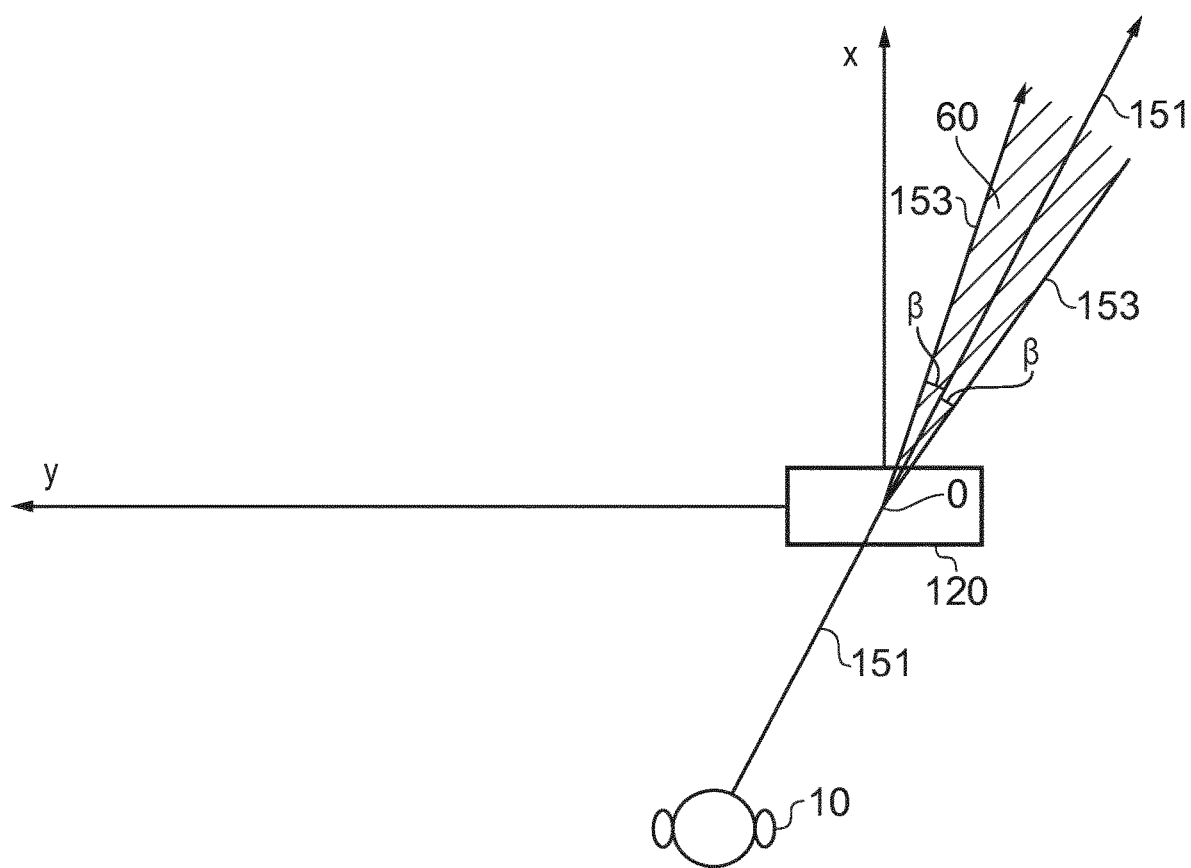
FIG. 8A shows another example embodiment of the subject matter described herein.
Figure 8B:
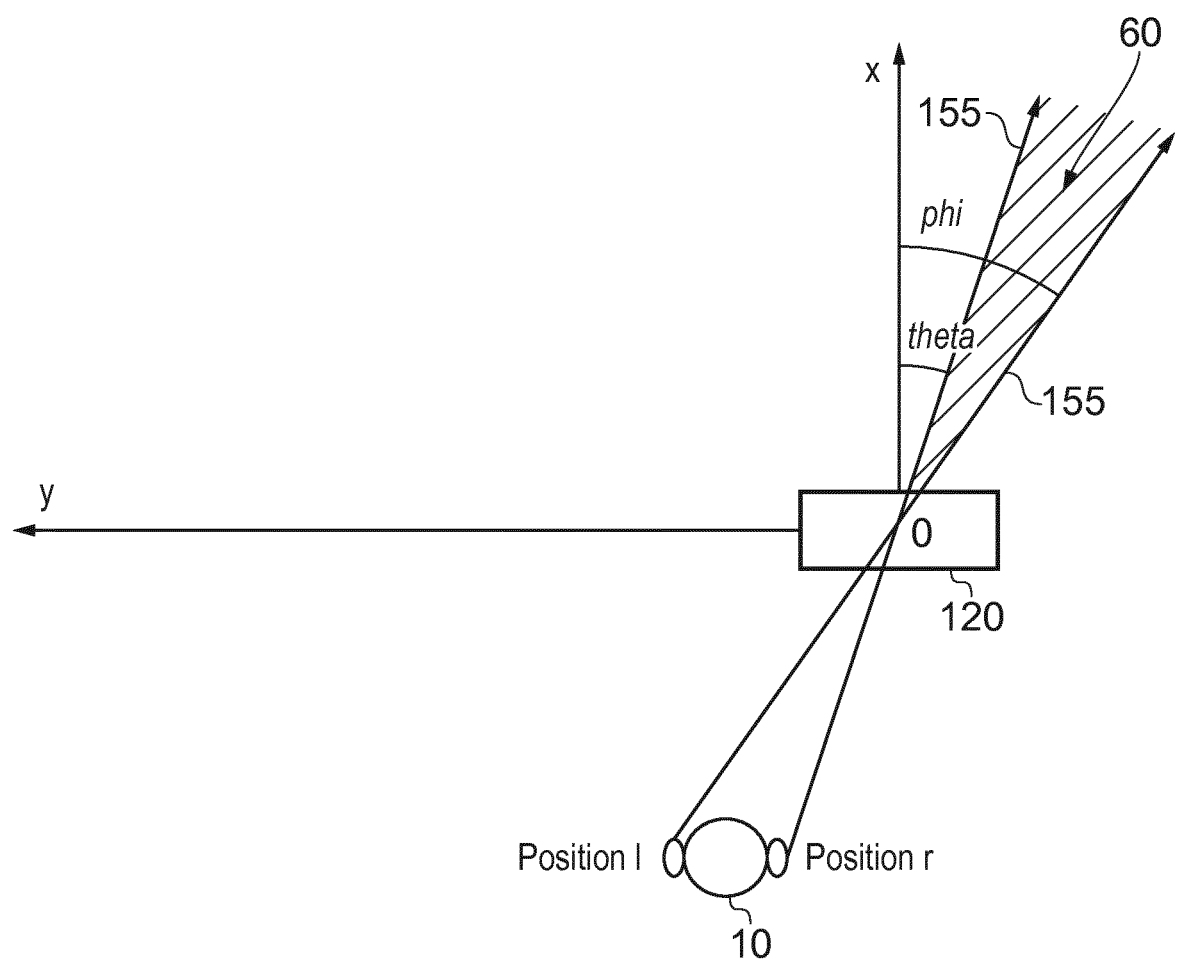
FIG. 8B shows another example embodiment of the subject matter described herein.

In the examples of FIGS. 8A and 8B and other examples, the sub-volume 60 of the sound space terminates at the position of the loudspeaker in the sound space. The sub-volume of the sound space has an apex at the defined position in the sound space.

In the examples illustrated in FIGS. 8A and 8B, the sound space volume 60 is a sector subtended by an angle at the position of the loudspeaker 120 that depends upon a distance of the user 10 from the loudspeaker 120.

Figure 9:
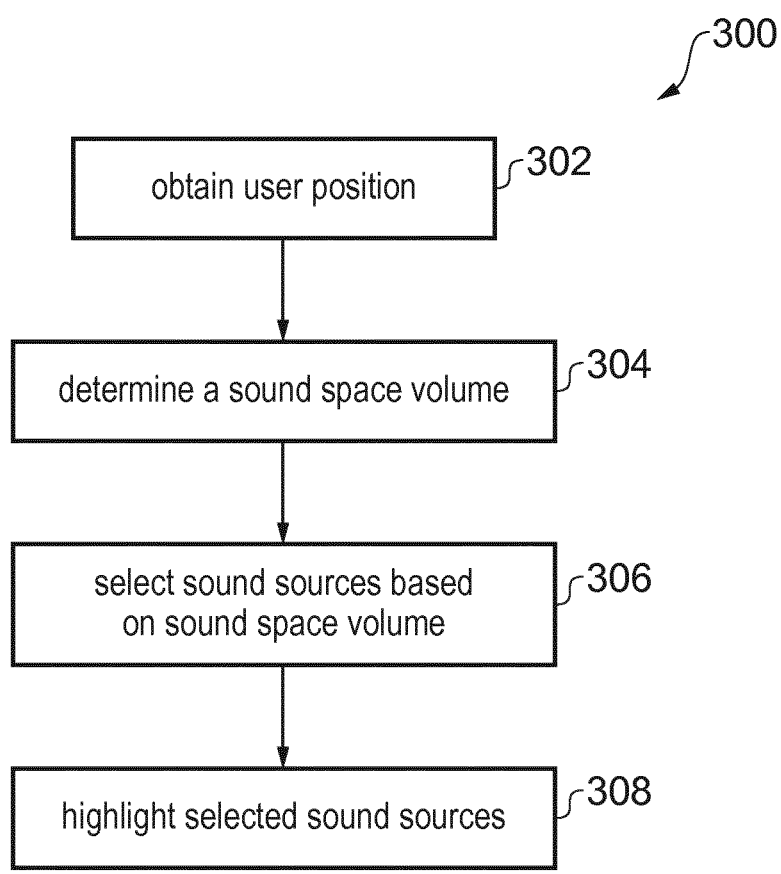
FIG. 9 shows another example embodiment of the subject matter described herein.

FIG. 9 illustrates an example of a method 300 for determining a sound space volume 60. The method may be performed by the synthesis circuitry 146.

At block 302, the method 300 first obtains the user position with respect a defined position in a sound space that comprises an arrangement of a plurality of sound sources 30 at different positions.

In some examples, block 302 may comprise determining a variable position of a user in the sound space. For example, block 302 may comprise obtaining an indication of a variable position of at least one user in real space; and mapping the position of the user in real space to a position of the user in a sound space.

The defined position can be a position of the loudspeaker 120 in the sound space.

For the purpose of determining the sound space volume 60, the system can define the coordinate system such that the loudspeaker 120 is at the defined position (the origin) and the user position is determined as polar coordinates (azimuth, elevation, distance) with respect to the defined position (the origin). Moving the loudspeaker 120 moves the origin and requires calculating sound source location with respect to the new origin.

Based on the user position with respect to the origin, at block 304, the synthesis circuitry 146 determines the sound space volume 60 on the opposite side of the loudspeaker 120.

In this example, the sound space volume 60 is a sector defined by obtaining the positions of user 10 relative to the origin.

In the example, illustrated in FIG. 8A, a sector is defined by obtaining a position of the user 10. A first virtual line 151 is extended through a point O at the origin to the opposite side of the origin. Second virtual lines 153 are extended through the point O at the origin, to the opposite side of the origin, with equal angular separation β from the first virtual line 151. The sector 60 between the second virtual lines 153 at the opposite side of the loudspeaker 120 define the sound space volume 60.

In the example, illustrated in FIG. 8B, a sector is defined by obtaining the positions of a left ear l and right ear r of the user 10. This may be estimated by tracking a position and orientation of a user's head. Virtual lines 155 are extended from the left-ear and right-ear positions, through a point O at the origin, to the opposite side of the origin. The sector 60 between the extended virtual lines 155 at the opposite side of the loudspeaker 120 define the sound space volume 60. The sector is bounded by azimuth angles phi and theta which are defined by the origin and the slope of the found lines.

Referring to both FIGS. 8A and 8B, in some examples, at a defined first distance of the loudspeaker 120 from the user 10, the sector is at minimum opening angle and at a defined other distance of the loudspeaker 120 from the user 10, the sector is at maximum opening angle. These parameters may be defined by a content creator and transmitted in or with the audio content 143. An example is to define that a sector maximum width is 180 degrees and it is obtained at distance of 10 cm and a sector minimum width is 5 degrees and it is obtained at a distance of 3 m. When the distance between user 10 and the loudspeaker 120 is between the first distance and the other distance, the sector opening angle is linearly adjusted based on the distance. For example, if distance is midway between first and the other distance, the sector angle is the average of minimum angle and maximum angle.

Referring to both FIGS. 8A and 8B, the sub-volume 60 of the sound space excludes the position of the user 10 in the sound space.

The sub-volume 60 of the sound space can be sized in dependence upon the position of the user 10 in the sound space. For example, the sub-volume 60 can be sized in dependence upon the position of the user in the sound space relative to a defined position in the sound space.

In the examples of FIGS. 8A and 8B and other examples, the sub-volume 60 of the sound space terminates at the defined position in the sound space. The sub-volume of the sound space has an apex at the defined position in the sound space.

For at least a range distances between the position of the user in the sound space and the defined position in the sound space, the size of the sub-volume increase as the distance between the position of the user in the sound space the defined position in the sound space decreases and the size of the sub-volume decreases as the distance between the position of the user in the sound space the defined position in the sound space increases.

In the examples of FIGS. 8A and 8B and other examples, the defined position is a position of the loudspeaker in the sound space and the sub-volume 60 is sized in dependence upon the position of the user in the sound space relative to the position of the loudspeaker in the sound space.

The position of the loudspeaker in real space can be mapped to the defined position in the sound space As previously described, an orientation of the loudspeaker in real space is mapped to an orientation of the loudspeaker in the sound space and the orientation in the sound space is used to determine the sound scene.

At block 306, the method then determines sound sources within the sound space volume 60. The sound sources 30 can be determined as those sound sources whose direction of arrival or position in the virtual space falls within the sound space volume 60. In this example, the sound scene is defined by the one or more sound sources of the plurality of sound sources that are "within" sub-volume 60.

At block 308, audio processing is used to modify the sound sources 30 within the sound space volume 60 relative to sound sources 30 outside the sound space volume 60 thereby highlighting the sound sources 30 within the sound space volume 60.

Highlighting may be achieved by selectively including/excluding sound sources 30 in the audio signal 131.

The method 300, therefore controls an output audio signal 131, for rendering a sound scene by the loudspeaker 120, where the sound scene is defined by the one or more sound sources of the plurality of sound sources that are within a sub-volume 60 of the sound space that excludes the position of the user 10 in the sound space and that is sized in dependence upon the position of the user 10 in the sound space.

Highlighting may be achieved by selectively changing characteristics of sound sources 30 in the audio signal 131.

In some examples, highlighting may be restricted to a sub-set of sound sources 30 within the sound space volume 60. For example, highlighting may be restricted based upon one or more of: loudness of the sound source 30, importance of the sound source 30, distance of the sound source 30 from the origin. For example, in one example highlighting is restricted to the K sound sources 30 within the sound space volume 60 that are closest to the origin.

In some examples, highlighting a sound source 30 by selectively changing characteristics of the sound source 30 comprises:

applying a reverberation effect or applying a different reverberation effect; and/or mixing into an audio channel that is not delayed (direct), a delayed version of that audio channel (indirect) or mixing into an audio channel that is not delayed (direct), to a different relative extent, a delayed version of that audio channel (indirect); and/or changing a distance to a sound source 30; and/or changing a gain (intensity) of a sound source 30; and/or
changing a ratio of direct channel to ambient channel.

Figure 10:
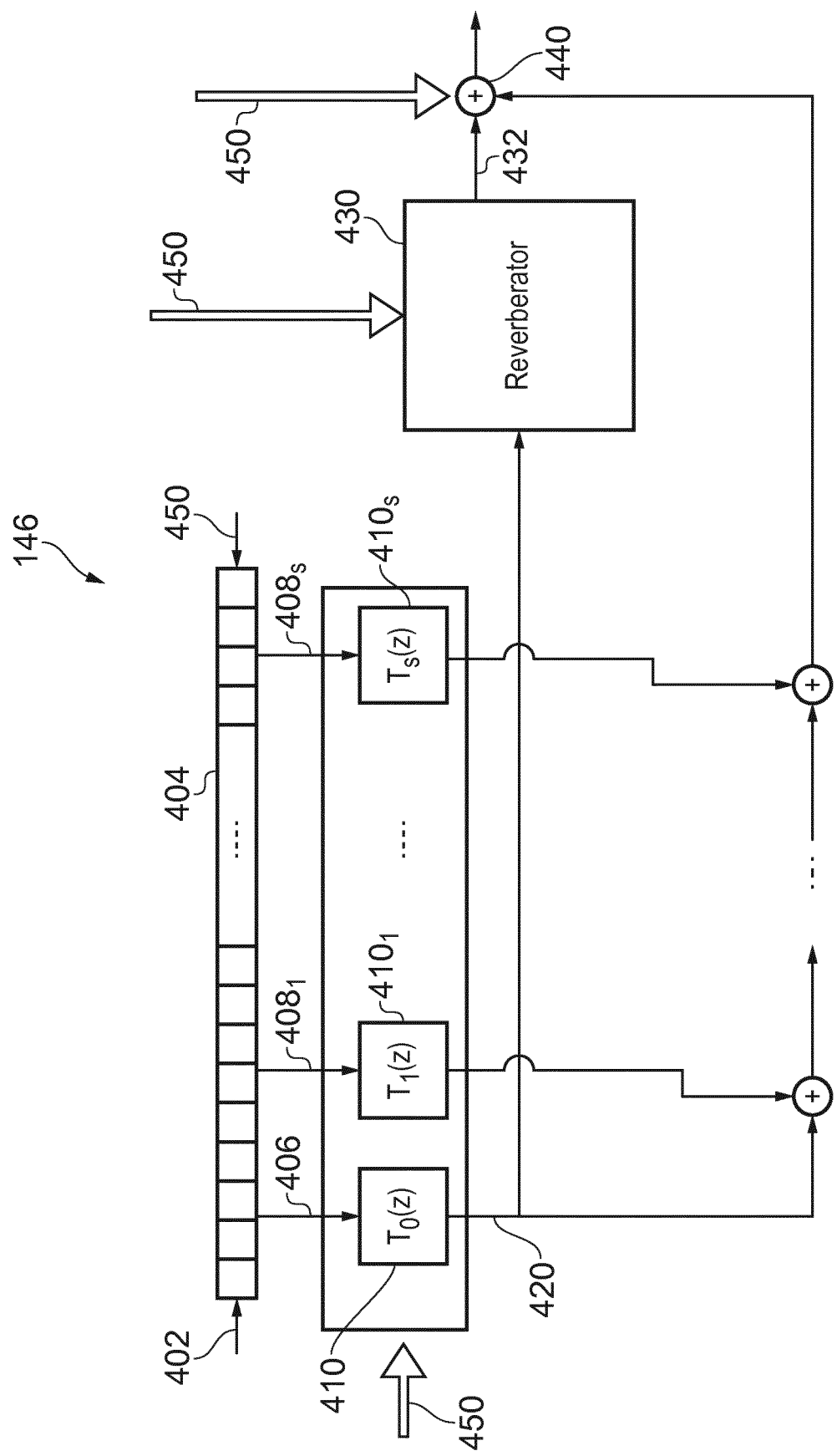
FIG. 10 shows another example embodiment of the subject matter described herein.

FIG. 10 depicts details of synthesizing that could occur within the synthesis circuitry 146 when the audio content 143 comprises audio objects.

The audio object 402 is fed to a delay line 404, and the direct sound 406 and directional early reflections 408 are read at suitable delays. The delays corresponding to early reflections can be obtained by analyzing the time delays of the early reflections from a measured or idealized room impulse response.

The direct sound 406 is fed to a source directivity and/or distance/gain attenuation modelling filter $T_0(z)$ 410. This applies level adjustment and directionality processing. The attenuated and directionally-filtered direct sound 420 is then passed to the reverberator 430 which produces incoherent output 432.

Each of the directional early reflections 408, is fed to a source directivity and/or distance/gain attenuation modelling filter $T_i(z)$ 410$i$. This applies level adjustment and directionality processing.

The attenuated and directionally-filtered direct sound 420 and the attenuated and directionally-filtered directional early reflections 420$i$ are mixed together with the incoherent output 432 at the mixer 440.

Control parameters 450 may be used to control delays in the delay line 404;

directivity and/or distance/gain at the filters 410, 410$i$; reverberation parameters of the reverberator 430; the respective gains applied to the directionally-filtered direct sound 420 and the attenuated and directionally-filtered directional early reflections 420$i$ and the incoherent output 432, at the mixer 440.

Some control parameters may be included in or associated with the audio content 143. The control parameters vary based on loudspeaker position and user position to achieve the effects described above.

Distance rendering is in practice done by modifying the gain and direct to wet ratio (or direct to ambient ratio).

For example, the direct signal gain can be modified according to 1/distance so that sounds which are farther away get quieter inversely proportionally to the distance.

The direct to wet ratio decreases when objects get farther. A simple implementation can keep the wet gain constant within the listening space and then apply distance/gain attenuation to the direct part.

Alternatively, gain for dry is maximal when the sound object is close and gain for wet maximal when the sound object is far.

The other audio objects are processed similarly, and then summed together to form a monophonic output as the audio signal 131.

The audio signal content in this single channel reflects the object position in the audio scene if room reflections are modified and synthesized according to object position in the audio scene. However, it does not contain spatial information which would enable creating a spatial percept for the listener.

Although the audio content 143 may encode the spatial audio as audio objects, in other examples the spatial audio may be encoded as audio signals with parametric side information.

The audio signals can be, for example, First Order Ambisonics (FOA) or its special case B-format, Higher Order Ambisonics (HOA) signals or mid-side stereo. For such audio signals, synthesis which utilizes the audio signals and the parametric metadata is used to synthesize the audio scene so that a desired spatial perception is created.

The parametric metadata may be produced by different techniques.

For example, Nokia's spatial audio capture (OZO Audio) or Directional Audio Coding (DirAC) can be used. Both capture a sound field and represent it using parametric metadata.

The parametric metadata may for example comprise:
direction parameters that indicate direction per frequency band;
distance parameters that indicate distance per frequency band;
energy-split parameters that indicate diffuse-to-total energy ratio per frequency band.

The energy-split parameters may be a ratio of diffuse energy to total energy, for example, as applied in the context of DirAC. The energy-split parameters may be a ratio of direct energy to total energy, for example, as applied in the context of OZO Audio. Either of these parameters can be used and one can be converted to the other as total energy=direct energy+diffuse energy.

Figure 11:
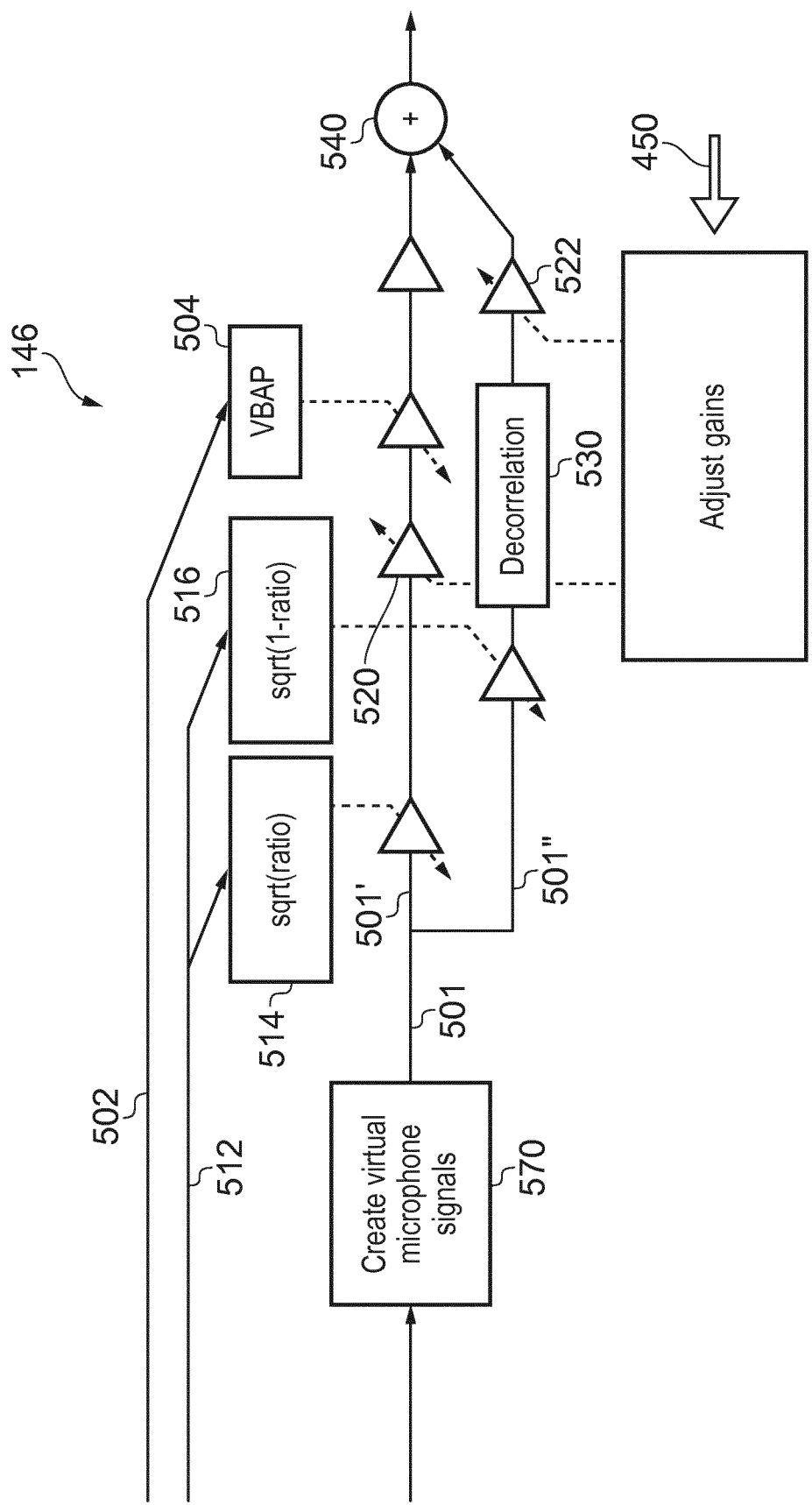
FIG. 11 shows another example embodiment of the subject matter described herein.

If one considers each time-frequency tile of a virtual microphone signal as a separate sound source 501, then as illustrated in FIG. 11, in the synthesis circuitry 146, the direction parameter 502 for that source controls vector based amplitude panning 504 for a direct version 501' of that virtual sound source 501 and the energy-split parameter 512 controls differential gain applied 514 to the direct version 501' of the virtual sound source 501 and applied 516 to an indirect version 501" of the virtual sound source 501.

The indirect version 501" of the virtual sound source 50' is passed through a decorrelator 530. The direct version 501' of the virtual sound source 501 is not.

The synthesis circuitry 146 controls the audio signal 131 by modifying the parametric metadata for each time-space frequency tile and treating each time-space frequency tile as a separate virtual sound source 501.

This has the effect of changing the differential gains between the direct (dry) version 501' and the indirect (wet) version 501" of the virtual sound source 501. And this effect may be achieved, by modifying the parametric metadata or without modification of the parametric metadata as illustrated by additional gain 520 for the direct version 501' of the virtual sound source 501 and additional gain 522 for the indirect version 501" of the virtual sound source 501. The additional gains 520, 522 are controlled via control parameters 450.

The resulting direct version 501' of the virtual sound source 501 and indirect version 501" of the virtual sound source 501 are mixed together at mixer 540 to produce an audio signal for that virtual sound source. The audio signals for the multiple virtual sound sources 501 are mixed together to create the output audio signal 131.

In the example illustrated a common decorrelation filtering is applied across all sound objects by decorrelator 530. In other examples this may be varied. The decorrelation filter may be different for each spatial direction, for example, for each loudspeaker channel.

In an alternative example, VBAP and creation of loudspeaker signals can be omitted and the mono mix created directly from summed output of direct and indirect versions for each time-frequency tile.

Figure 12:
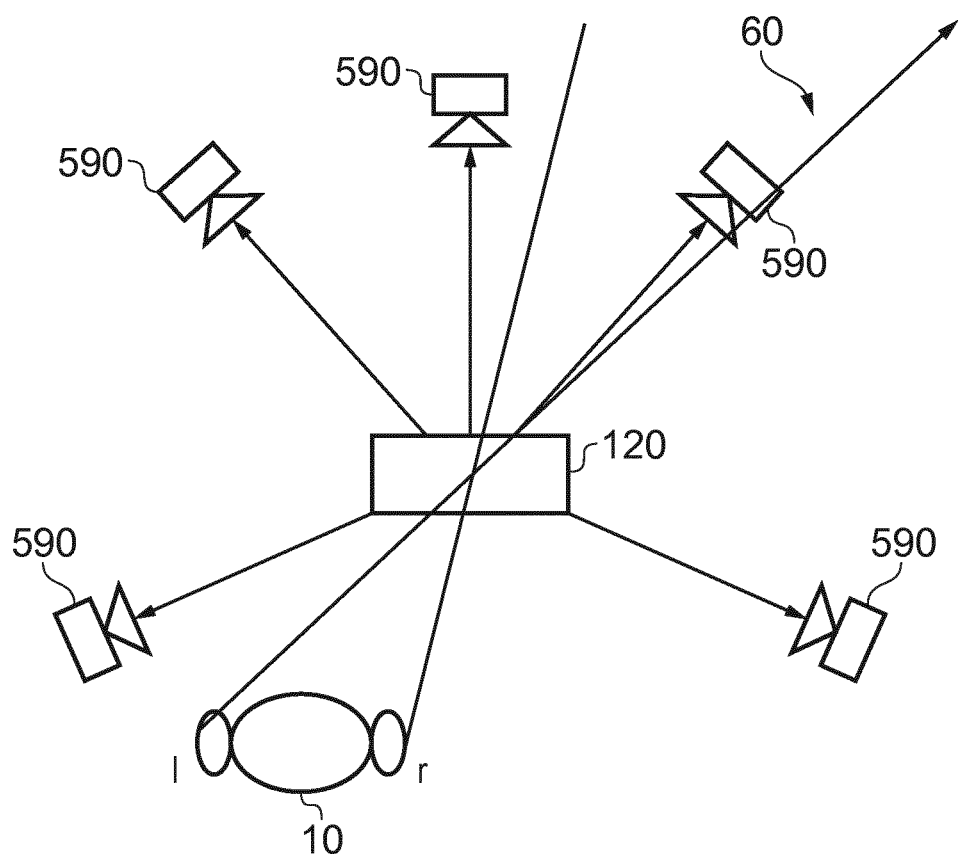
FIG. 12 shows another example embodiment of the subject matter described herein.

FIG. 12 depicts a principle where five virtual loudspeakers 590 are positioned around the monophonic loudspeaker 120. The loudspeaker 120 reproduces a monophonic downmix of the virtual loudspeaker signals.

The synthesis circuitry 146 may be configured to treat each loudspeaker as a sound source and selectively highlight one or more sound sources. The synthesis circuitry 146 is configured to perform a weighted summation of the loudspeaker signals (sound sources), with the weighting being dependent upon whether or not the sound source is highlighted.

Figure 13:
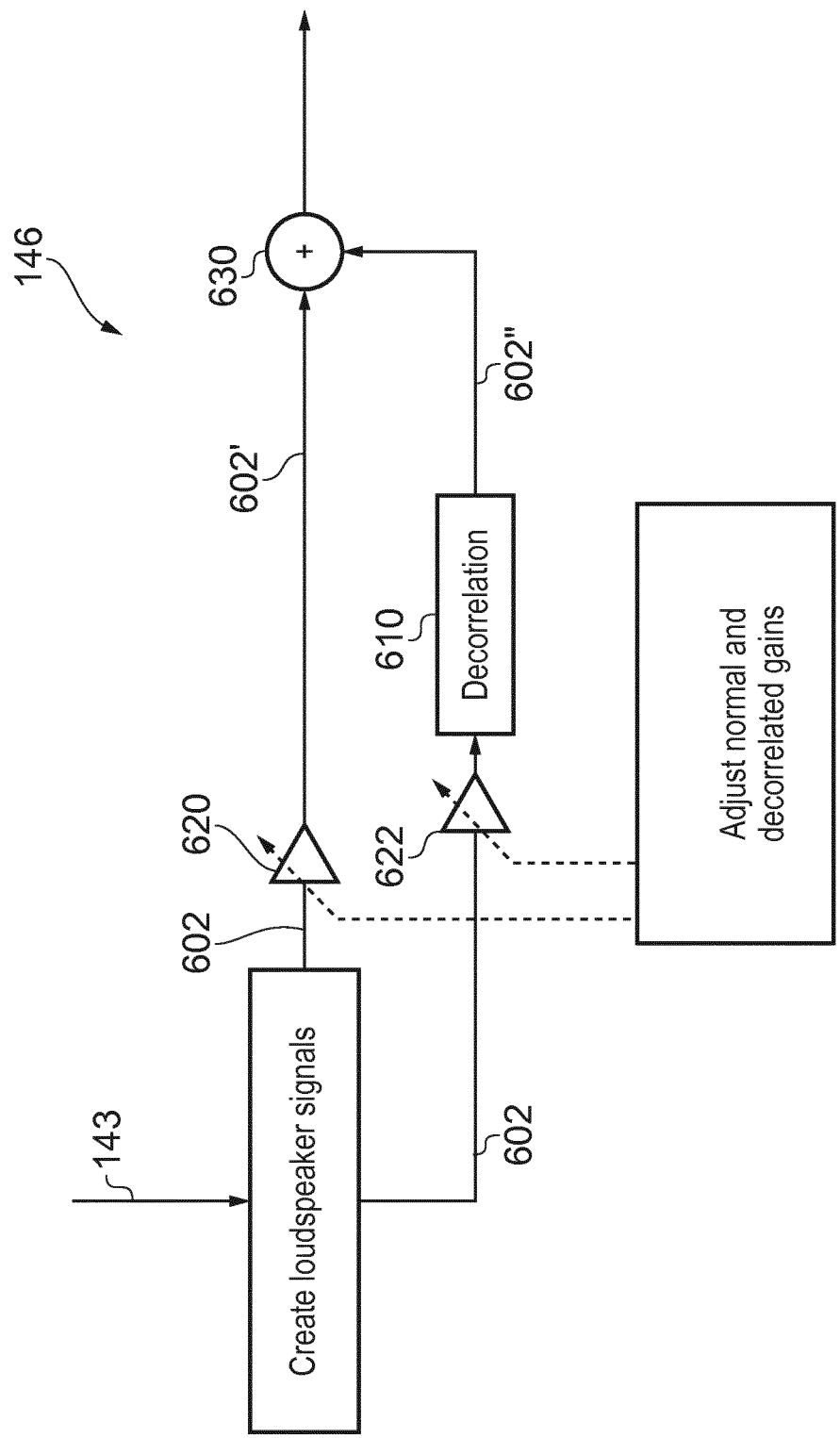
FIG. 13 shows another example embodiment of the subject matter described herein.

In the example illustrated in FIG. 13, the synthesis circuitry 146 is configured to convert the spatial audio content 143 into loudspeaker signals for N loudspeakers.

The synthesis circuitry 146 creates a direct (dry) version 602' of the loudspeaker signal and an indirect (wet) version of the loudspeaker signal 602 by using a decorrelation filter 610 to create the indirect version 602.

In this example the synthesis circuitry 146 is configured to highlight the sound source, the virtual loudspeaker signal 602 by applying a first gain 620 to the direct version 602' and a second gain 622 to the indirect version 602". The first and second gain are independently controllable.

The direct and indirect versions are then summed in mixer 630 to produce the monophonic output audio signal 131.

There are several additional positioning systems 110 available for tracking a position of the loudspeaker 120 and/or the user 10.

A Kinect™ type of sensor may be positioned on the edge of the listening area, such a sensor projects a pattern using infrared and detects the reflected pattern using stereoscopic cameras. Augmented reality glasses, for example HoloIens™ (or something smaller in the near future), uses inside-out tracking to determine a user's head position and orientation. Apple ARKit or Google ARCore type of tracking on a mobile phones, sensors as used in an augmented/virtual reality head mounted displays such as the Lighthouse tracking used in the HTC Vive; sound source localization using several microphones; Camera based object tracking with deep convolutional neural networks; manual positioning, the user 10 may input the position of the loudspeaker 120 manually, using a UI on a mobile phone for example.

In some examples, the apparatus 132 comprises the loudspeaker 120.

In some examples, the apparatus 132 comprising the loudspeaker 120 has a shape and form of a loudspeaker 120.

In some examples the apparatus 132 comprises a user interface for controlling which audio content 143 is rendered.

MPEG-I Audio is currently developing spatial audio formats. This disclosure enables such an audio format to be rendered on lower capability devices, for example, stereo (without binaural rendering) and/or monophonic playback capable devices.

In some examples, the apparatus 132 may comprise the loudspeaker 120 and positioning system 110 within a portable electronic device. For example, the position of the user 10 is tracked by tracking a head position of a user 10 of the portable electronic device using a camera of the portable electronic device.

A position of a user 10 may be tracked by tracking a position of the portable electronic device carried by the user 10 using indoor positioning means or using satellite positioning, for example, Global Navigation Satellite System. Another 'loudspeaker' mobile phone is connected to the mobile phone being carried and renders the audio, or, the audio is rendered from a wireless loudspeaker 120 connected to the mobile phone.

In at least some embodiments, the system 100 works with multiple users 10. If more than one user 10 is using the system contemporaneously, the system works as follows:
 a monophonic mix is created for each user 10 as described above (based on his position).
 the original mix (taking into account only the loudspeaker 120 position) is mixed with the monophonic mixes of all of the users 10. This is then rendered from the loudspeaker 120.

One use example is that user Miikka has setup the loudspeaker 120 to his living room at a nice spot. He is listening to the music in the kitchen while cooking. A violin solo is about to start in the song being played. Miikka walks into the living room to hear it better, the system 100 starts to track Miikka and he moves to a position opposite to the violin to hear it better. The violin is now heard a little bit louder than in the original mix.

Another use example, is that Miikka enters a room with the loudspeaker 120 playing a piece of music. He is unhappy with the mix and brings up his mobile phone causing the system 100 to start tracking him. He walks around the room to different position while listening to the music. He finds a good mix and continues to listen to the music. He may save that mix so that it remains the same, even if he moves.

The ISO/IEC JTC1/SC29/VVG11 or MPEG (Moving Picture Experts Group) is currently standardizing technology called MPEG-I, which will facilitate rendering of audio for 3 DoF, 3 DoF+ and 6 DoF scenarios. The technology will be based on 23008-3:201x, MPEG-H 3D Audio Second Edition. MPEG-H 3D audio is used for the core waveform carriage (encoding, decoding) in the form of objects, channels, and Higher-Order-Ambisonics (HOA). The goal of MPEG-I is to develop and standardize technologies comprising metadata over the core MPEG-H 3D and new rendering technologies to enable 3 DoF, 3 DoF+ and 6 DoF audio transport and rendering. The audio content 142 may include parametric metadata that enables 6 DOF rendering over a MPEG-H 3D audio bitstream.

The above described examples, enable the system 100 to render audio in the MPEG-I format even though the system is not fully 6 DOF capable and is capable of only producing a monophonic output or a stereo (non-binaural) output.

The illustration or description of a connection between two features indicates that they are operationally coupled and any number or combination of intervening elements can exist (including no intervening elements)

Where a structural feature has been described, it may be replaced by means for performing one or more of the functions of the structural feature whether that function or those functions are explicitly or implicitly described.

In some but not necessarily all examples, the apparatus 132 is configured to communicate data to or from the apparatus 132 with or without local storage of the data in a memory 136 the apparatus 132 and with or without local processing of the data by circuitry or processors at the apparatus 132.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long range cellular radio links. The apparatus 132 may comprise a communications interface such as, for example, a radio transceiver for communication of data.

The apparatus 132 may be part of the Internet of Things forming part of a larger, distributed network.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the apparatus 132 where it may produce an output sensible to the subject such as an audio output, visual output or haptic output.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y uncles the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising
   at least one processor; and
   at least one non-transitory memory including computer program code;
   the at least one memory and the computer program code configured to, with the at least one processor, cause the apparatus at least to perform:
      obtain an indication of a variable position of at least one user in real space;
      map the variable position of the at least one user in the real space to a variable position of the at least one user in a sound space;
      map a position of a loudspeaker in the real space to a reference position in the sound space; and
      control an output audio signal, for rendering a sound scene with the loudspeaker, to highlight one or more sound sources comprised in a sub-volume of the sound space, where highlighting of the one or more sound sources is configured to be changed dependent upon the variable position of the at least one user in the sound space relative to the reference position in the sound space.

2. An apparatus as claimed in claim 1, wherein the sub-volume is sized or positioned or oriented in dependence upon the variable position of the at least one user in the sound space relative to the reference position in the sound space, wherein the sub-volume of the sound space comprises less than a whole of the sound space.

3. An apparatus as claimed claim 1, wherein highlighting the one or more sound sources comprised in the sub-volume comprises increasing a volume of the one or more sound sources or comprises decreasing a volume of one or more other sound sources.

4. An apparatus as claimed in claim 1, wherein the sub-volume excludes the variable position of the at least one user in the sound space, wherein the variable position of the at least one user in the sound space is different from the reference position.

5. An apparatus as claimed in claim 1, wherein the sub-volume is sized in dependence upon the variable position of the at least one user in the sound space relative to the reference position in the sound space, wherein the sound space comprises at least one sound source outside the sub-volume of the sound space, wherein the one or more sound sources comprised in the sub-volume of the sound space comprises at least two sound sources.

6. An apparatus as claimed in claim 1, wherein the sub-volume of the sound space terminates at the reference position in the sound space, wherein the loudspeaker comprises a single portable speaker.

7. An apparatus as claimed in claim 1, wherein the sub-volume of the sound space has an apex at the reference position in the sound space.

8. An apparatus as claimed claim 1, wherein, for at least a range of distances between the variable position of the at least one user in the sound space and the reference position in the sound space, a size of the sub-volume increases as a distance between the variable position of the at least one user in the sound space and the reference position in the sound space decreases and the size of the sub-volume decreases as the distance between the variable position of the at least one user in the sound space and the reference position in the sound space increases.

9. An apparatus as claimed in claim 1, wherein an orientation of the loudspeaker in the real space is mapped to an orientation of the loudspeaker in the sound space and the orientation in the sound space is used to determine the sound scene.

10. An apparatus as claimed in claim 1, wherein highlighting the one or more sound sources comprises one or more of:
    increasing gain of the one or more sound sources;
    applying a reverberation effect;
    applying a different reverberation effect;
    mixing into a first audio channel that is not delayed a delayed version of that first audio channel;
    mixing into a second audio channel that is not delayed, to a different relative extent, a delayed version of that second audio channel; or
    changing a distance to the one or more sound sources.

11. A method comprising:
    determining a variable position of a user in a sound space that comprises an arrangement of a plurality of sound sources at different positions;
    mapping a position of a loudspeaker in real space to a reference position in the sound space; and
    controlling an output audio signal, for rendering a sound scene with the loudspeaker, to highlight one or more of the plurality of sound sources comprised in a sub-volume of the sound space, where highlighting of the one or more sound sources is configured to be changed dependent upon the variable position of the user in the sound space relative to the reference position in the sound space.

12. A method as claimed in claim 11, wherein the sub-volume is sized or positioned or oriented in dependence upon the variable position of the user in the sound space relative to the reference position in the sound space.

13. A method as claimed in claim 11, wherein highlighting the one or more sound sources comprised in the sub-volume comprises increasing a volume of the one or more sound source or comprises decreasing a volume of one or more other sound sources.

14. A method as claimed in claim 11, wherein the sub-volume excludes the variable position of the user in the sound space.

15. A method as claimed in claim 11, wherein the sub-volume is sized in dependence upon the variable position of the user in the sound space relative to the reference position in the sound space.

16. A method as claimed in claim 11, wherein the sub-volume of the sound space terminates at the reference position in the sound space.

17. A method as claimed in claim 11, wherein the sub-volume of the sound space has an apex at the reference position in the sound space.

18. A method as claimed in claim 11, wherein, for at least a range of distances between the variable position of the user in the sound space and the reference position in the sound space, a size of the sub-volume increases as a distance between the variable position of the user in the sound space and the reference position in the sound space decreases and the size of the sub-volume decreases as the distance between the variable position of the user in the sound space and the reference position in the sound space increases.

19. A method as claimed in claim 11, wherein an orientation of the loudspeaker in the real space is mapped to an orientation of the loudspeaker in the sound space and the orientation in the sound space is used to determine the sound scene.

20. A non-transitory computer readable medium comprising program instructions stored thereon for performing at least the following:
   determine a variable position of a user in a sound space that comprises an arrangement of a plurality of sound sources at different positions;
   map a position of a loudspeaker in real space to a reference position in the sound space; and
   control an output audio signal, for rendering a sound scene with the loudspeaker, to highlight one or more of the plurality of sound sources comprised in a sub-volume of the sound space, where highlighting of the one or more sound sources is configured to be changed dependent upon the variable position of the user in the sound space relative to the reference position in the sound space.

* * * * *